US011689765B1

(12) United States Patent
Livoti et al.

(10) Patent No.: US 11,689,765 B1
(45) Date of Patent: Jun. 27, 2023

(54) METHODS AND APPARATUS FOR OBFUSCATED AUDIENCE IDENTIFICATION

(71) Applicant: The Nielsen Company (US), LLC, New York, NY (US)

(72) Inventors: John T. Livoti, Oldsmar, FL (US); Stanley Wellington Woodruff, Palm Harbor, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 17/732,999

(22) Filed: Apr. 29, 2022

Related U.S. Application Data

(60) Provisional application No. 63/266,289, filed on Dec. 31, 2021.

(51) Int. Cl.
*H04N 21/442* (2011.01)
(52) U.S. Cl.
CPC ............... *H04N 21/44218* (2013.01)
(58) Field of Classification Search
None
See application file for complete search history.

(56) References Cited

U.S. PATENT DOCUMENTS

| 4,858,000 | A | 8/1989 | Lu | |
|---|---|---|---|---|
| 6,824,317 | B2 | 11/2004 | Finizio et al. | |
| 7,814,061 | B2* | 10/2010 | Kuberka | G06F 16/51 |
| | | | | 707/661 |
| 8,767,037 | B2 | 7/2014 | Krishnan et al. | |
| 9,179,058 | B1* | 11/2015 | Zeira | H04N 23/661 |
| 11,017,901 | B2* | 5/2021 | Chevalier | G16H 40/63 |
| 2009/0138805 | A1* | 5/2009 | Hildreth | H04N 21/4751 |
| | | | | 715/745 |
| 2009/0290756 | A1* | 11/2009 | Ramaswamy | H04N 21/44222 |
| | | | | 382/103 |
| 2010/0046797 | A1* | 2/2010 | Strat | H04N 7/173 |
| | | | | 382/173 |
| 2012/0072940 | A1* | 3/2012 | Fuhrer | H04H 60/31 |
| | | | | 725/13 |
| 2014/0299775 | A1* | 10/2014 | Kimmel | G01P 13/00 |
| | | | | 250/341.8 |
| 2015/0189378 | A1* | 7/2015 | Soundararajan | H04N 21/4524 |
| | | | | 725/12 |
| 2015/0213702 | A1* | 7/2015 | Kimmel | G06V 20/52 |
| | | | | 382/103 |

(Continued)

OTHER PUBLICATIONS

Li et al., "Face Recognition in Low Quality Images: A Survey", Retrieved from [arXiv:1805.11519v3] Article from ACM Computing Survey, vol. 1, No. 1, Dated Apr. 2019, 27 pages.

(Continued)

*Primary Examiner* — Alexander Q Huerta
(74) *Attorney, Agent, or Firm* — Hanley, Flight & Zimmerman, LLC

(57) ABSTRACT

Methods and apparatus for obfuscated audience identification are disclosed. An example apparatus includes a camera to capture an obfuscated recording of a viewing environment, feature identifying circuitry to identify one or more features of a viewer in the viewing environment based on the obfuscated recording, and panelist identifying circuitry to identify a panelist in the viewing environment based on the one or more identified features of the viewer.

26 Claims, 16 Drawing Sheets

(56) References Cited

U.S. PATENT DOCUMENTS

| | | | | |
|---|---|---|---|---|
| 2016/0065902 A1* | 3/2016 | Deng | ............ | H04H 60/31 |
| | | | | 348/77 |
| 2017/0308993 A1* | 10/2017 | Thurling | ............ | G09G 3/2092 |
| 2018/0124456 A1* | 5/2018 | Terrazas | ............ | H04N 5/33 |
| 2018/0249200 A1* | 8/2018 | Wang | ............ | H04N 21/4223 |
| 2020/0311635 A1* | 10/2020 | Emig | ............ | G06Q 10/1095 |
| 2022/0058382 A1* | 2/2022 | LiVoti | ............ | G06V 40/172 |

OTHER PUBLICATIONS

Aldred, John, "Facial Recognition Systems Can Identify You Even If Your Face is Pixelated", retrieved online from [https://www.diyphotography.net/facial-recognition-systems-can-identify-even-face-pixelated] on Aug. 19, 2022, dated Sep. 13, 2016, 9 pages.

* cited by examiner

US 11,689,765 B1

METHODS AND APPARATUS FOR OBFUSCATED AUDIENCE IDENTIFICATION

RELATED APPLICATION

This patent claims the benefit of U.S. Provisional Patent Application No. 63/266,289, which was filed on Dec. 31, 2021. U.S. Provisional Patent Application No. 63/266,289 is hereby incorporated herein by reference in its entirety. Priority to U.S. Provisional Patent Application No. 63/266,289 is hereby claimed.

FIELD OF THE DISCLOSURE

This disclosure relates generally to television audience measurement and, more particularly, to methods and apparatus for obfuscated audience identification.

BACKGROUND

Media providers and/or other entities such as, for example, advertising companies, broadcast networks, etc. are often interested in the viewing, listening, and/or media behavior of audience members and/or the public in general. The media usage and/or exposure habits of monitored audience members, as well as demographic data about the audience members, are collected and used to statistically determine the size and demographics of an audience of interest.

Traditionally, audience measurement entities determine audience engagement levels for media programming and/or advertisements based on registered panel members. That is, an audience measurement entity enrolls people who consent to being monitored into a panel. The audience measurement entity then monitors those panel members to collect media measurement data identifying media (e.g., television programs, radio programs, movies, DVDs, etc.) presented to those panel members. In this manner, the audience measurement entity can determine exposure measures for different media (e.g., content and/or advertisements) based on the collected media measurement data.

Figure 1:
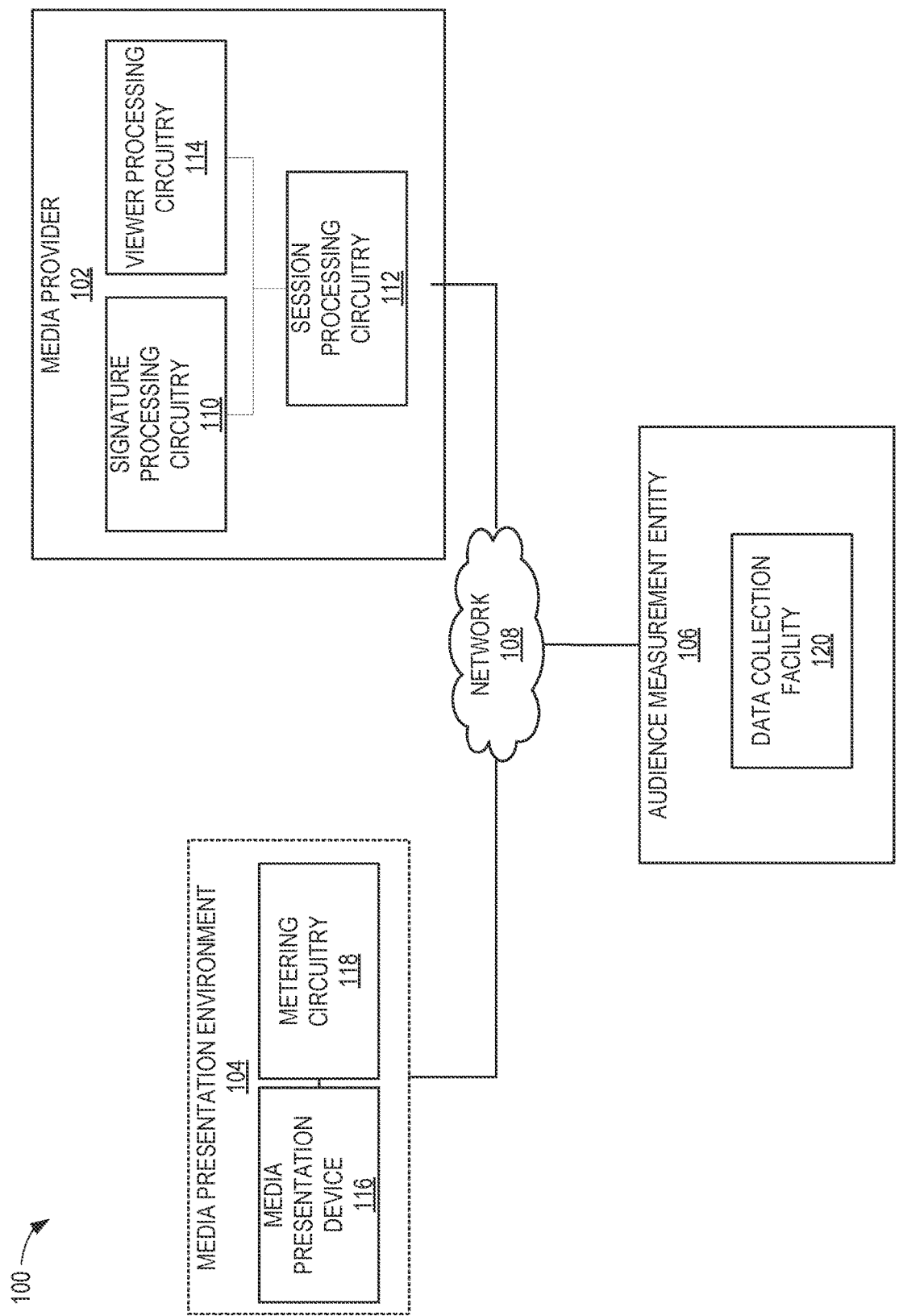
FIG. 1 is a block diagram of an example audience analysis system.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processor circuitry is/are best suited to execute the computing task(s).

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

As used herein, data is information in any form that may be ingested, processed, interpreted and/or otherwise manipulated by processor circuitry to produce a result. The produced result may itself be data.

As used herein, "threshold" is defined to be data such as a numerical value represented in any form, that may be used by processor circuitry as a reference for a comparison operation.

As used herein, a model is a set of instructions and/or data that may be ingested, processed, interpreted and/or otherwise manipulated by processor circuitry to produce a result. Often, a model is operated using input data to produce output data in accordance with one or more relationships reflected in the model. The model may be based on training data.

As used herein, a "camera" is a device for recording visual images in the form of photographs, film, or video signals. For example, a "camera" can be a still-image camera, a video camera, a camcorder, a webcam, or any other device that can capture a depiction of something.

As used herein, an "obfuscated recording" is an image or video that is blurry, pixelated, or otherwise unclear to any naked human eye. For example, an "obfuscated recording" of an environment can produce people in the environment in a humanly unidentifiable manner and/or cause text in the viewing environment to be illegible. Accordingly, as used herein, to "obfuscate" an environment is to cause the environment to appear in an image or video as blurry, pixelated, out of focus, or otherwise unclear to any naked human eye.

Example methods, apparatus, and articles of manufacture disclosed herein monitor media presentations (e.g., smart television application sessions) at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

Audience measurement entities desire knowledge on how users interact with media devices such as smartphones, tablets, laptops, smart televisions, etc. In particular, audience measurement entities want to monitor media presentations (e.g., smart television application sessions, viewing sessions, audio-only application sessions, etc.) made at the media devices to, among other things, monitor exposure to advertisements, determine advertisement effectiveness, determine user behavior, identify purchasing behavior associated with various demographics, etc. In some instances, the audience measurement entities collect viewer data during smart television application sessions to determine characteristics (e.g., demographics) of an audience associated with the sessions. The characteristics of the audience associated with the smart television application session can be utilized to determine attributes, such as advertisements, recommendations, etc., to associate with programs encountered during the session.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some instances, an audience measurement entity will prompt a viewer in the audience to indicate who is interacting with (e.g., watching, listening to, etc.) the media periodically such that any changes in the audience can be identified. For instance, every 42 minutes the audience measurement entity can cause a prompt to be transmitted to the audience, which enables the viewer to indicate who is in the audience. Specifically, the viewer may select certain registered panelists and/or indicate that one or more guests are interacting with the media. However, this can be burdensome to the viewer who would prefer to interact with the media without any interruptions. Accordingly, the periodic prompts may cause the viewer to opt out of any panel in which they were participating to avoid the hassle, which results in a loss of potentially useful data for the audience measurement entity.

In some instances, to collect the data with less of a burden on the viewer, the audience measurement entity identifies viewers in the audience through a camera that records an environment in which the media is presented (e.g., a viewing environment). While such instances may provide fewer prompts and interruptions to the audience during the media presentation, viewers are often uncomfortable with allowing a camera to record them in an otherwise private environment. Further, recording the viewing environment can bring about additional security concerns that may arise, such as if a malicious third party were to gain access to the camera. As such, having the camera record the audience often deters potential panelists from participating in a panel, which again causes the audience measurement entity to miss out on potential data.

Methods and apparatus for obfuscated audience identification are disclosed. The example methods and apparatus disclosed herein capture an obfuscated (e.g., blurred, clouded, pixelated, etc.) recording of a viewing environment. As such, an audience associated with a media presentation can be monitored while preventing the recording of the viewing environment from being overly intrusive or burdensome through frequent prompting of the audience. In turn, the example methods and apparatus disclosed herein can remove or otherwise reduce potential security or privacy concerns associated with recording the viewing environment. Additionally, the example methods and apparatus disclosed herein can increase a likelihood that potential panelists choose to participate in a panel, which enables a collection of data that would otherwise be unavailable.

In some examples, to capture the obfuscated recording of the viewing environment, audience metering circuitry includes a camera with an obfuscating lens. For example, the obfuscating lens can include an average surface roughness that is within a certain range (e.g., greater than 50 Angstrom (Å) root mean square (RMS), between 100 Å RMS and 300 Å RMS, between 200 Å RMS and 500 Å RMS, etc.) such that certain features of viewers in the audience can be identified without capturing a clear depiction of the viewers. That is, the obfuscating lens can have an average surface roughness that satisfies (e.g., is greater than) a first roughness threshold (e.g., a threshold defined by a roughness that would cause the audience to be humanly identifiable) while also satisfying a second roughness threshold (e.g., a threshold defined by a roughness that would cause certain features of the viewers to be unidentifiable by processor circuitry). Furthermore, the obfuscating lens can have a maximum surface roughness (e.g., vertical distance from peak to valley in a profile of the surface) that satisfies (e.g., is less than) a third roughness threshold such that a particular area of the viewing environment is not overly impaired in response to being captured through a portion of the obfuscating lens that has the maximum surface roughness. Additionally or alternatively, other roughness metrics can be utilized, such as an average maximum height of the profile, to ensure that the surface of the obfuscating lens obfuscates a view of the camera to be while still enabling certain features and/or movements of a viewer to be identified.

The obfuscating lens may undergo surface treatment to form a surface having a surface roughness between the first roughness threshold and the second roughness threshold. In some examples, the obfuscating lens is a piece of glass or plastic that is sprayed with one or more chemicals that (e.g., chemically sprayed to) deform the surface of the obfuscating lens. For example, the chemical(s) can wear down the surface of the obfuscating lens or cause the surface to erode to create the surface roughness. Additionally or alternatively, the surface of the obfuscating lens can be sanded (e.g., rubbed with abrasive paper) and/or sandblasted (e.g., sprayed with an abrasive material) to roughen the surface of the obfuscating lens.

In some other examples, the obfuscating lens may obfuscate the view of the camera through other means than a surface roughness. For example, the obfuscating lens can be sprayed with a chemical(s) that causes a frost or cloudiness to be formed on the surface, which can obfuscate the view through the lens. In some examples, a thin layer of material can be positioned over the surface of the obfuscating lens to obfuscate the view therethrough. Additionally or alternatively, the obfuscating lens may have a certain prescription that causes the viewing environment to become blurred through the view of the camera.

In addition or as an alternative to the obfuscating lens, the audience metering circuitry can include image obfuscating circuitry to prevent the camera from capturing a non-obfuscated recording of the viewing environment. For example, to record the viewing environment, the audience metering circuitry may utilize a camera belonging to the viewer (e.g., a webcam), in which case the lens is not obfuscated. In some examples, the image obfuscating circuitry includes a hardware driver and/or a software driver that limits a resolution with which the camera can record the viewing environment. As such, the image obfuscating circuitry can cause the camera to record the viewing environment with a resolution that satisfies (e.g., is less than) a first resolution threshold such that the recorded viewing environment does not depict audience members in a manner that is humanly recognizable. Additionally, the image obfuscating circuitry can cause the resolution to satisfy (e.g., be greater than) a second resolution threshold such that audience recognition circuitry can still detect certain movements and/or features in the audience to identify audience members.

In examples disclosed herein, the image obfuscating circuitry can adjust or modify signals generated by an image sensor in the camera in advance of image processing circuitry receiving and processing the signals to generate the recording of the viewing environment. Specifically, the image sensor includes light detectors (e.g., complementary metal-oxide-semiconductor (CMOS) active-pixel sensors) that generate a voltage and/or a current that corresponds to a color in a location of the viewing environment. In some examples, the image obfuscating circuitry analyzes sets of the signals from a group or a block of light detectors (e.g., a 3×3 block of the light detectors, a 9×9 block of the light detectors, etc.). In some examples, the image obfuscating circuitry modifies the signals in a set to cause the signals to be indicative of a same color. For example, the image obfuscating circuitry can average the signals to cause the voltages and/or the currents of the signals to match. In some examples, the image obfuscating circuitry causes one of the signals to override and/or replace a remainder of the signals. For example, the image obfuscating circuitry can cause the signal with a minimum voltage, a maximum voltage, or a mode voltage encountered within the group to be representative of the group. Alternatively, the image obfuscating circuitry can cause the signal associated with a center light detector in the group to override the signals from the other light detectors in the group.

In some examples, the image obfuscating circuitry determines the overriding signal based on a pattern in the signals.

In such examples, the pattern in the signals can correspond to a typical signal pattern seen for eyes, hair, or another feature that can be utilized to identify viewers and, in turn, the image obfuscating circuitry can cause a signal in a certain area of the pattern to override other signals. For example, the image obfuscating circuitry can cause a signal corresponding to irises of the viewer to override other signals in an eye region such that an eye color is identifiable while obfuscating an identity of the viewer. In some examples, the image obfuscating circuitry determines which signals are to override other signals based on features utilized to identify certain viewers in the viewing environment. For example, the image obfuscating circuitry can communicate with audience identifying circuitry and determine the signals that are to be overriding in certain areas of the recording based on features that are utilized in an identification of a typical audience member.

As such, the image obfuscating circuitry can relay a signal including a voltage or a current for the group of light detectors to the image processing circuitry. In turn, the image processing circuitry can generate a series of bits based on the signal, which are representative of a color for an area in the recording that corresponds with the respective light detectors. As such, the image obfuscating circuitry can cause the image processing circuitry to produce a pixelated recording with a reduced resolution compared to a resolution that the image processing circuitry is capable of producing alone with the image sensor. Thus, the image processing circuitry can produce an obfuscated recording of the viewing environment to relieve viewers of security or privacy concerns. In addition to enabling the recording to become blurred or pixelated, the image obfuscating can enable the image processing circuitry to process fewer signals for each frame of the recording. As such, the image processing circuitry can generate the frames of the recording at a faster rate. In turn, the faster frame rate enables viewer identifying circuitry to identify viewers closer to real time.

Additionally or alternatively, the image sensor can include a reduced quantity of the light detectors, which, in turn, causes the image processing circuitry to reproduce the viewing environment with a reduced resolution. In some examples, the image obfuscating circuitry can include different amplifiers (e.g., different metal-oxide-semiconductor field-effect transistors (MOSFETs)) for the respective light detectors to increase noise in the recording. That is, a variance in voltage gain between the amplifiers associated with the respective light detectors can cause different light detectors to generate different voltages in response to detecting the same color (e.g., receiving the same electromagnetic signal indicative of the same color). Thus, when the image processing circuitry processes the signals from the light detectors, the colors can be distorted compared to the actual viewing environment, which can cause the viewer to be humanly unrecognizable in the recording.

Further, in response to the image processing circuitry producing the obfuscated recording, the feature identifying circuitry can identify one or more features of a viewer in the viewing environment based on the obfuscated recording. For example, the feature identifying circuitry can identify a silhouette of the viewer. In turn, the feature identifying circuitry may identify a facial region of the viewer in the obfuscated recording. In some examples, the feature identifying circuitry searches for the silhouette of the viewer in the viewing environment in response to motion detecting circuitry detecting motion within the viewing environment.

In some examples, the feature identifying circuitry determines a size of the viewer and/or a size of a certain portion of the viewer based on the identified silhouette. In some examples, the feature identifying circuitry causes the camera to zoom in on the identified facial region of the viewer. As such, the feature identifying circuitry can identify one or more facial features of the viewer. That is, the feature(s) of the viewer identifiable by the feature identifying circuitry can include(s) sizes of the viewer and/or particular areas of the viewer, such as the face, torso, or limbs of the viewer. Furthermore, the feature(s) of the viewer identifiable by the feature identifying circuitry can include a size, a shape, a color, and/or a relative location of eyebrows of the viewer, a size, a shape, a color, and/or a relative location of hair of the viewer, a position and/or a size of eyes of the viewer, a position and/or a size of a nose of the viewer, etc.

The feature identifying circuitry can indicate the identified feature(s) to audience identifying circuitry, which can determine an identification associated with the viewer. For example, the audience identifying circuitry can correlate the identified features with features associated with registered panelists. The audience identifying circuitry can learn the features associated with the registered panelists over time. For example, the audience identifying circuitry can cause the registered panelists to identify themselves when in the viewing environment during an initial training period. In turn, the audience identifying circuitry can utilize machine learning to learn certain features associated with the respective panelists. Accordingly, in response to the identified features matching, or being similar to, the features associated with the registered panelist, the audience identifying circuitry can determine the viewer in the obfuscated recording is the registered panelist. In turn, the panelist and/or demographics associated therewith can be associated with media being presented in the viewing environment while the obfuscated recording is captured.

FIG. 1 is a block diagram of an example audience analysis system 100. In FIG. 1, the audience analysis system 100 includes a media provider 102, a media presentation environment 104, an audience measurement entity 106, and a network 108. In FIG. 1, the media provider 102, the media presentation environment 104, and the audience measurement entity 106 are communicatively coupled via the network 108.

In the illustrated example of FIG. 1, the network 108 provides communication between the media provider 102, the media presentation environment 104, and the audience measurement entity 106. In FIG. 1, the network 108 is implemented as a public network such as, the Internet. However, any other type of networks (e.g., wired/cabled, wireless, mobile cellular, etc.) which may be public or private, and any combination thereof may additionally and/or alternatively be used. Additionally, although the example audience analysis system 100 utilizes the network 108 for communications between the media provider 102, the media presentation environment 104, and the audience measurement entity 106, it should be understood that the media provider 102, the media presentation environment 104, and/or the audience measurement entity 106 can communicate using any alternative forms of communication to implement the examples disclosed herein.

In the illustrated example of FIG. 1, the media provider 102 includes signature processing circuitry 110, session processing circuitry 112, and viewer processing circuitry 114. Further, the media presentation environment 104 includes a media presentation device 116 and metering circuitry 118. Additionally, the audience measurement entity 106 includes a data collection facility 120.

In the illustrated example of FIG. 1, the signature processing circuitry 110 generates signatures and identifiers to be assigned to media presentations. For example, the signature processing circuitry 110 can generate the signatures in the form of one or more optical signals and/or audio signals, such as a watermark(s), to be presented with media. Further, the signature processing circuitry 110 can generate the identifiers in the form of alphanumeric values or any other codes. In FIG. 1, the signature processing circuitry 110 links respective identifiers to respective signatures. In turn, the signature processing circuitry 110 transmits the signatures with the linked identifiers to the session processing circuitry 112. Additionally, the media provider 102 can transmit the signatures and the linked identifiers to the media presentation environment 104 via the network 108. In some examples, the signature processing circuitry 110 is instantiated by processor circuitry executing instructions and/or configured to perform operations such as those represented by the flowchart of FIG. 6.

In FIG. 1, the session processing circuitry 112 inserts the signature into media that is to be presented during a viewing session. That is, in response to receiving the signature and the linked identifier, the session processing circuitry 112 can overlay, or insert a clip presenting, the signature in media to be presented during the viewing session. For example, the media provider 102 can transmit the signature to the media presentation environment 104 in response to receiving a first signal indicative of a start of the viewing session. Additionally, the media provider 102 can receive a second signal indicative of an end time of the viewing session. In turn, the session processing circuitry 112 can identify a start time, an end time, and/or a duration of the viewing session in response to receiving the first signal and/or the second signal. Further, the media provider 102 can receive an address (e.g., a serial number, an Internet Protocol (IP) address, etc.) of a media device associated with the viewing session with the first signal and/or the second signal. In the illustrated example, the session processing circuitry 112 transmits the identifier associated with the signature presented during the viewing session to the viewer processing circuitry 114 along with the start time of the viewing session, the end time of the viewing session, the duration of the viewing session, and/or the address of the media device associated with the viewing session. In some examples, the session processing circuitry 112 is instantiated by processor circuitry executing instructions and/or configured to perform operations such as those represented by the flowchart of FIGS. 6 and/or 10.

In the illustrated example of FIG. 1, the viewer processing circuitry 114 stores the identifier linked to the signature presented during the viewing session. Additionally, the viewer processing circuitry 114 can store characteristics of the viewing session, such as the address of the media device associated with the viewing session, the start time of the viewing session, the end time of the viewing session, and/or the duration of the viewing session. In turn, the viewer processing circuitry 114 can identify the media encountered during the viewing session based on the address of the media device associated with the viewing session, the start time of the viewing session, the end time of the viewing session, and/or the duration of the viewing session. Accordingly, the viewer processing circuitry 114 can link the media encountered during the viewing session with the identifier associated with the signature presented during the viewing session. In some examples, the viewer processing circuitry 114 is instantiated by processor circuitry executing instructions and/or configured to perform operations such as those represented by the flowchart of FIG. 10.

In the illustrated example of FIG. 1, the media provider 102 receives session demographics reports from the audience measurement entity 106 via the network 108. For example, the audience measurement entity 106 can indicate the identifier associated with the signature presented during the viewing session, demographics of the viewer (e.g., a panelist), media devices associated with the viewer, and/or a timestamp associated with the viewing session to the media provider 102. Thus, the viewer processing circuitry 114 can identify the viewing session and, in turn, media that the viewer encountered based on the identifier, the media devices associated with the viewer, and/or the timestamp associated with the viewing session. As a result, the viewer processing circuitry 114 can associate the media encountered by the viewer with the demographics of the viewer. In turn, the media provider 102 can determine advertisements and/or other recommendations to associate with the media based on the demographics of the viewers that encounter the media.

In the illustrated example of FIG. 1, the media presentation device 116 presents (e.g., displays, outputs, etc.) the media. Accordingly, one or more viewers (e.g., a panelist(s)) associated with the metering circuitry 118 encounter the media. Specifically, the panelist(s) are users registered on panels maintained by a ratings entity (e.g., an audience measurement company) that owns and/or operates the ratings entity subsystem. In some examples, the media presentation device 116 is instantiated by processor circuitry executing instructions and/or configured to perform operations such as those represented by the flowchart of FIG. 7.

In FIG. 1, the media presentation device 116 transmits a signal to the media provider 102 via the network 108 in response to the start and/or the end of the viewing session. The signal can include an address associated with the media presentation device 116. Further, the media presentation device 116 receives the signature to be presented with the media during the viewing session via the network 108. In turn, the media presentation device 116 can present the signature in advance of, or with, the media.

In the illustrated example of FIG. 1, the metering circuitry 118 identifies the signature presented by the media presentation device 116. Additionally, the metering circuitry 118 receives the linked signatures and identifiers from the media provider 102 via the network 108. In turn, the metering circuitry 118 can determine the identifier associated with the viewing session based on the identified signature. In some examples, the metering circuitry 118 generates a timestamp in response to determining the identifier and/or in response to identifying the signature. In some examples, the metering circuitry 118 is instantiated by processor circuitry executing instructions and/or configured to perform operations such as those represented by the flowchart of FIG. 8.

In the illustrated example of FIG. 1, the metering circuitry 118 identifies one or more viewers associated with the viewing session. For example, the metering circuitry 118 can include a camera that records an obfuscated view of the viewing environment where the media presentation device 116 presents the media, as discussed in further detail below. Further, the metering circuitry 118 can identify one or more features of the viewer(s) encountering the media via the obfuscated recording. In turn, the metering circuitry 118 can determine whether the viewer(s) is/are registered panelist(s) associated with the media presentation device and/or guests of the registered panelists based on the identified feature(s). For example, the metering circuitry 118 can correlate the identified feature(s) with stored feature(s) of the panelist(s). In some examples, the metering circuitry 118 determines that a viewer is a guest of the panelist(s) in response to the identified feature(s) not matching the stored features of the panelists. Further, the metering circuitry 118 can determine a panelist identifier(s) of the viewer(s) based on the stored feature(s) that match the identified feature(s) in the obfuscated recording. In turn, the metering circuitry 118 can generate a session report including the panelist identifier(s), the timestamp, and the identifier associated with the signature identified during the viewing session. In FIG. 1, the metering circuitry 118 transmits the session report to the audience measurement entity 106.

In the illustrated example of FIG. 1, the data collection facility 120 receives the session report from the metering circuitry 118 via the network 108. In some examples, the data collection facility 120 identifies demographics (e.g., an age, a gender, an ethnicity, etc.) of the panelist(s) associated with the viewing session based on the panelist identifier(s) in the session report. Additionally, the data collection facility 120 can determine an address(es) of a device(s) associated with the panelist(s) based on the panelist identifier(s) in the session report. In FIG. 1, the data collection facility 120 generates a session demographics report based on the identifier in the session report, the timestamp associated with the viewing session, the demographics associated with the panelist identifier(s), and/or the device(s) associated with the panelist identifier(s). In some examples, the audience measurement entity 106 transmits the session demographics report to the media provider 102 via the network 108. In some examples, the data collection facility 120 is instantiated by processor circuitry executing instructions and/or configured to perform operations such as those represented by the flowchart of FIG. 9.

Figure 2:
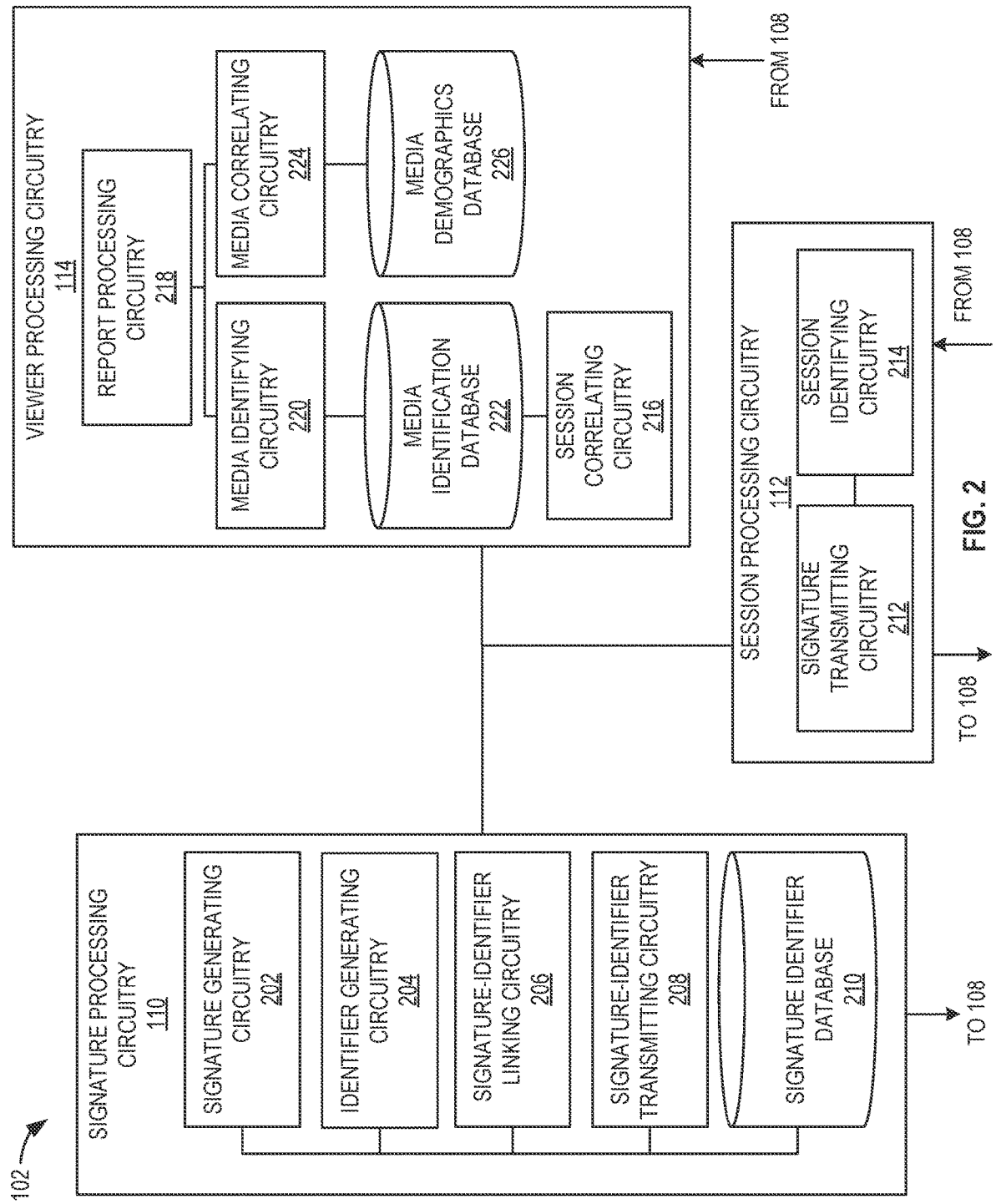
FIG. 2 is a block diagram of an example media provider of the example audience analysis system of FIG. 1.

FIG. 2 is a block diagram of the example media provider 102 of FIG. 1. In the illustrated example, the media provider 102 includes the signature processing circuitry 110, the session processing circuitry 112, and the viewer processing circuitry 114 of FIG. 1. In FIG. 2, the signature processing circuitry 110, the session processing circuitry 112, and the viewer processing circuitry 114 are communicatively coupled to the network 108 of FIG. 1.

In FIG. 2, the signature processing circuitry 110 includes signature generating circuitry 202, identifier generating circuitry 204, signature-identifier linking circuitry 206, signature-identifier transmitting circuitry 208, and a signature-identifier database 210. Further, the session processing circuitry 112 includes signature transmitting circuitry 212 and session identifying circuitry 214. Additionally, the viewer processing circuitry 114 includes session correlating circuitry 216, report processing circuitry 218, media identifying circuitry 220, a media identification database 222, media correlating circuitry 224, and a media demographics database 226.

In FIG. 2, the signature generating circuitry 202 generates signatures for viewing sessions. For example, the signature generating circuitry 202 can generate the signatures as codes (e.g., watermarks) to be embedded in media associated with the viewing sessions. Further, the signature generating circuitry 202 can transmit the signatures to the signature-identifier linking circuitry 206. In some examples, the signature generating circuitry 202 is instantiated by processor circuitry executing instructions and/or configured to perform operations such as those represented by the flowchart of FIG. 6.

In FIG. 2, the identifier generating circuitry 204 generates identifiers to be associated with viewing sessions. For example, the identifier generating circuitry 204 can generate the identifiers in the form of a string of alphanumeric characters, a bar code, and/or any other code. In turn, the identifier generating circuitry 204 can transmit the identifiers to the signature-identifier linking circuitry 206. In some examples, the identifier generating circuitry 204 is instantiated by processor circuitry executing instructions and/or configured to perform operations such as those represented by the flowchart of FIG. 6.

In FIG. 2, the signature-identifier linking circuitry 206 links the generated signatures and identifiers. In some examples, more than one signature is to be associated with the viewing session and, in turn, the signature-identifier linking circuitry 206 can link multiple signatures to a single identifier. Accordingly, the signature-identifier linking circuitry 206 pairs the signature(s) and the identifier to be associated with a respective viewing session. The signature-identifier linking circuitry 206 transmits the linked signatures and identifiers to the signature-identifier database 210. Further, the signature processing circuitry 110 can transmit the signatures and the associated identifiers to the session processing circuitry 112. In some examples, the signature-identifier linking circuitry 206 is instantiated by processor circuitry executing instructions and/or configured to perform operations such as those represented by the flowchart of FIG. 6.

In FIG. 2, the signature-identifier transmitting circuitry 208 transmits the signatures and the associated identifiers to the media presentation environment 104 of FIG. 1 via the network 108. For example, the signature-identifier transmitting circuitry 208 can transmit the signature-identifier database 210 to the metering circuitry 118 of FIG. 1 via the network 108 to provide the metering circuitry 118 access to the identifiers associated with the respective signatures to be presented during viewing sessions. In some examples, the signature-identifier transmitting circuitry 208 is instantiated by processor circuitry executing instructions and/or configured to perform operations such as those represented by the flowchart of FIG. 6.

In FIG. 2, the signature transmitting circuitry 212 inserts the signatures into respective viewing sessions. For example, the session processing circuitry 112 can receive a signal indicative of a start of the viewing session from the media presentation device 116 of FIG. 1 via the network 108. In turn, the signature transmitting circuitry 212 can transmit a signature to be presented in advance of, or during, the viewing session to the media presentation device 116 via the network 108. In some examples, the session processing circuitry 112 transmits the signature with (e.g., embedded in) media to be presented during the viewing session. In some examples, the signature transmitting circuitry 212 is instantiated by processor circuitry executing instructions and/or configured to perform operations such as those represented by the flowchart of FIG. 6.

In FIG. 2, the session identifying circuitry 214 receives the identifiers and the associated signatures from the signature processing circuitry 110. In some examples, the session identifying circuitry 214 indicates the signatures to be transmitted with the media to the signature transmitting circuitry 212. For example, the session identifying circuitry 214 can track a queue of the identifiers and the associated signatures to be utilized based on the identifiers that are not assigned to viewing sessions. In some examples, the session identifying circuitry 214 is instantiated by processor circuitry executing instructions and/or configured to perform operations such as those represented by the flowchart of FIGS. 6 and/or 10.

In FIG. 2, the session identifying circuitry 214 receives a signal indicative of an identifier being received in a report (e.g., a session demographics report) via the network 108. In FIG. 2, the session identifying circuitry 214 updates the queue in response to receiving the signal indicative of the identifier being received in the report. Specifically, the session identifying circuitry 214 adds the identifier and the associated signature into the queue. Further, the session identifying circuitry 214 removes the identifier and the associated signature from the queue in response to the signature transmitting circuitry 212 transmitting the signature. As a result, the signature transmitting circuitry 212 transmits distinct signatures for viewing sessions without depleting a supply of the signatures.

In FIG. 2, the session identifying circuitry 214 determines the viewing session associated with the transmitted signature. For example, the session processing circuitry 112 can receive a signal indicative of an end of the viewing session via the network 108. In turn, the session identifying circuitry 214 can determine a start time, an end time, and/or a duration of the viewing session. Additionally, the session processing circuitry 112 receives an address of the media device associated with the viewing session (e.g., the media presentation device 116 of FIG. 1). In FIG. 2, the session identifying circuitry 214 associates the identifier associated with the signature presented during the viewing session with the address of the media device, the start time of the viewing session, the end time of the viewing session, and/or the duration of the viewing session. In FIG. 2, the session processing circuitry 112 indicates the identifier along with the address of the media device, the start time, the end time, and/or the duration of the viewing session to the viewer processing circuitry 114.

In FIG. 2, the session correlating circuitry 216 receives the identifier for the viewing session with the address of the media device, the start time, the end time, and/or the duration of the viewing session. In FIG. 2, the viewer processing circuitry 114 receives data indicative of specific media encountered by media devices via the network 108. The session correlating circuitry 216 can identify media presented during the viewing based on the address of the media device, the start time, the end time, and/or the duration of the viewing session. In some examples, the session correlating circuitry 216 links the identifier associated with the signature presented during the viewing session and the identified media of the viewing session. In turn, the session correlating circuitry 216 can store the identifier with the media via the media identification database 222. Alternatively, the session correlating circuitry 216 can store the identifier with the address of the media device, the start time, the end time, and/or the duration of the viewing session via the media identification database 222. In some examples, the session correlating circuitry 216 is instantiated by processor circuitry executing instructions and/or configured to perform operations such as those represented by the flowchart of FIGS. 6 and/or 10.

In FIG. 2, the viewer processing circuitry 114 receives session demographics reports via the network 108. For example, the session demographics reports can include the identifier associated with the signature presented during the viewing session, demographics of the panelists(s) associated with the viewing session, an address(es) of a media device(s) associated with the panelist, and/or a timestamp associated with the viewing session. The audience measurement entity 106 of FIG. 1 generates the session demographics report for the viewing session, as discussed further in association with FIG. 5. In FIG. 2, the report processing circuitry 218 receives the session demographics report. In some examples, the report processing circuitry 218 causes the viewer processing circuitry 114 to transmit a signal indicative of the received identifier to the session processing circuitry 112 such that the session identifying circuitry 214 can update the queue of identifiers and signatures to be associated with subsequent viewing sessions.

In FIG. 2, the report processing circuitry 218 identifies demographics of the panelist(s) associated with the viewing session, the identifier associated with the viewing session, the time of the viewing session, and/or the media device(s) associated with the panelist(s) via the session demographics report. In FIG. 2, the report processing circuitry 218 transmits the identifier associated with the viewing session, the time of the viewing session, and/or the media device(s) associated with the panelist to the media identifying circuitry 220. Further, the report processing circuitry 218 transmits the demographics of the panelist(s) associated with the viewing session to the media correlating circuitry 224. In some examples, the report processing circuitry 218 is instantiated by processor circuitry executing instructions and/or configured to perform operations such as those represented by the flowchart of FIG. 10.

In FIG. 2, the media identifying circuitry 220 identifies media that was encountered during the viewing session. For example, the media identifying circuitry 220 can identify the viewing session in the media identification database 222 based on the media device(s) associated with the panelist(s), the identifier associated with the viewing session, and/or the time of the viewing session. Specifically, the media identifying circuitry 220 can perform a look-up of the identifier received in the sessions demographics report to locate the viewing session in the media identification database 222. In some examples, the media identifying circuitry 220 compares the media device(s) associated with the panelist(s) to the address of the media device for the viewing session to verify that the viewing session is in fact associated with the panelist(s). In some examples, the media identifying circuitry 220 compares the time of the viewing session to the start time, the end time, and/or the duration of the viewing session in the media identification database 222 to verify that the viewing session is associated with the panelist(s). In FIG. 2, the media identifying circuitry 220 identifies the media encountered during the viewing session based on the media associated with the identifier of the viewing session. In FIG. 2, the media identifying circuitry 220 transmits a signal indicative of the media encountered during the viewing session to the media correlating circuitry 224. In some examples, the media identifying circuitry 220 is instantiated by processor circuitry executing instructions and/or configured to perform operations such as those represented by the flowchart of FIG. 10.

In FIG. 2, the media correlating circuitry 224 correlates the media encountered during the viewing session with the demographics of the panelist(s). For example, the media correlating circuitry 224 can receive the demographics of the panelist(s) via the report processing circuitry 218. Further, the media correlating circuitry 224 can identify the media encountered during the viewing session in response to receiving the signal indicative of the media via the media identifying circuitry 220. In turn, the media correlating circuitry 224 saves the media encountered during the viewing session with the associated demographics of the panelist in the media demographics database 226. As such, the media demographics database 230 can be utilized to determine a relationship between media interests and certain demographics. Further, the media provider 102 can utilize the media interests of certain demographics to determine advertisements, media recommendations, etc., to associate with the media that appeals to the demographics of the viewers that typically encounter the media. In some examples, the media correlating circuitry 224 is instantiated by processor circuitry executing instructions and/or configured to perform operations such as those represented by the flowchart of FIG. 10.

Figure 3:
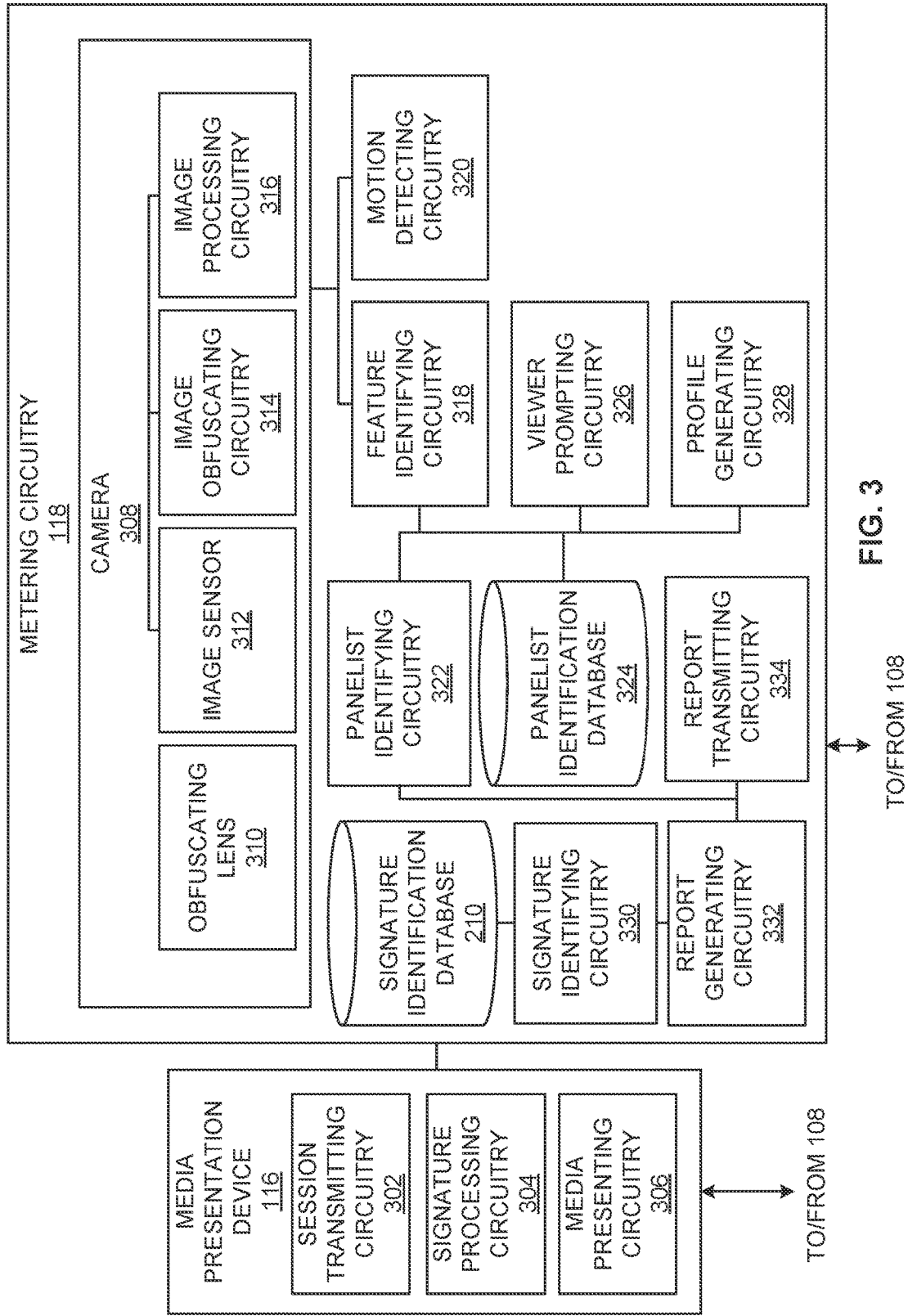
FIG. 3 is a block diagram of an example media presentation environment of the example audience analysis system of FIG. 1.

FIG. 3 is a block diagram of the example media presentation environment 104 of FIG. 1. In FIG. 3, the media presentation environment 104 includes the media presentation device 116 and the metering circuitry 118 of FIG. 1. In FIG. 3, the media presentation device 116 includes session transmitting circuitry 302, signature processing circuitry 304, and media presenting circuitry 306. In FIG. 3, the metering circuitry 118 includes a camera 308 including an obfuscating lens 310, an image sensor 312, image obfuscating circuitry 314, and image processing circuitry 316. Further, the metering circuitry 118 includes feature identifying circuitry 318, motion detecting circuitry 320, panelist identifying circuitry 322, a panelist identification database 324, viewer prompting circuitry 326, profile generating circuitry 328, signature identifying circuitry 330, report generating circuitry 332, and report transmitting circuitry 334. Additionally, the metering circuitry 118 includes the signature-identifier database 210. For example, the metering circuitry 118 can receive the signature-identifier database 210 from the media provider 102 via the network 108.

In FIG. 3, the media presentation device 116 presents media to one or more viewers (e.g., panelist(s) and/or guests of the panelist(s)) during a viewing session. In some examples, the media provider 102 transmits the media to the media presentation device 116 via the network 108.

In FIG. 3, the session transmitting circuitry 302 transmits a signal indicative of a start of the viewing session to the media provider 102 via the network 108. In some examples, the session transmitting circuitry 302 transmits the signal indicative of the start of the viewing session in response to receiving media to present to the viewer. In some examples, the session transmitting circuitry 302 transmits the signal indicative of the start of the viewing session in response to the media presentation device 116 being powered on. Further, the session transmitting circuitry 302 transmits a signal indicative of the end of the viewing session to the media provider 102 via the network 108. For example, the session transmitting circuitry 302 can transmit the signal indicative of the end of the viewing session in response to a user powering down the media presentation device 116. Additionally, the session transmitting circuitry 302 transmits a signal indicative of an address associated with the media presentation device 116 (e.g., a serial number, an Internet Protocol (IP) address, an identification value, etc.) to the media provider 102 via the network 108. In some examples, the session transmitting circuitry 302 is instantiated by processor circuitry executing instructions and/or configured to perform operations such as those represented by the flowchart of FIG. 7.

In FIG. 3, the signature processing circuitry 304 receives a signal indicative of a signature (e.g., a watermark) associated with the viewing session via the network 108. In FIG. 3, the signature processing circuitry 304 indicates the signature to the media presenting circuitry 306. In some examples, the signature processing circuitry 304 is instantiated by processor circuitry executing instructions and/or configured to perform operations such as those represented by the flowchart of FIG. 7.

In FIG. 3, the media presenting circuitry 306 presents the received signature with the received media. For example, the media presenting circuitry 306 can embed the signature into the media and/or insert a clip at a start of the viewing session that presents the signature. In some examples, the media presenting circuitry 306 presents the media in response to presenting the signature. In some examples, the media presenting circuitry 306 is instantiated by processor circuitry executing instructions and/or configured to perform operations such as those represented by the flowchart of FIG. 7.

In FIG. 3, the camera 308 of the metering circuitry 118 records an obfuscated view of a viewing environment that encounters the media. Specifically, the obfuscating lens 310 and/or the image obfuscating circuitry 314 can cause the camera to record the obfuscated view of the viewing environment. Accordingly, recording the obfuscated view of the viewing environment as opposed to a clear depiction (e.g., non-obfuscated view) can cause the viewer(s) to feel more comfortable with having the metering circuitry 118 in a private environment. For example, the obfuscated view can prevent the viewer(s) from feeling as if the metering circuitry 118 is overly intrusive through the recording of the viewing environment. In turn, capturing the obfuscated view can increase a likelihood that potential panelists choose to participate in a panel.

In FIG. 3, the obfuscating lens 310 can alter a passage of light therethrough (e.g., from the viewing environment to the image sensor 312) such that the image sensor 312 receives the light in a manner that differs from the light existing in the viewing environment. In the illustrated example, the obfuscating lens 310 can prevent light rays (e.g., electromagnetic rays in the visible spectrum) from traveling through the lens in certain locations and/or distort the light rays in certain locations. For example, the image obfuscating lens can cause the distorted light rays to be projected onto an increased quantity of light detectors in the image sensor 312, which can obfuscate (e.g., blur, cloud, distort, etc.) a depiction of the viewing environment that the image sensor 312 receives. The obfuscating lens 310 can include a rough surface, a clouded surface, a certain prescription, or a surface that is otherwise altered to obfuscate the viewing environment, as discussed further in association with FIG. 4.

In FIG. 3, the image sensor 312 includes an array of light detectors, such as CMOS active-pixel sensors. The light detectors produce signals corresponding to wavelengths of the respective light rays that contact the light detectors. That is, the light detectors can generate a voltage indicative of a color in a corresponding location of the viewing environment. In turn, the image sensor 312 can relay the signals to the image obfuscating circuitry 314. In some examples, the image sensor 312 relays the signals to the image processing circuitry 316. For example, when the obfuscating lens 310 sufficiently obfuscates the viewing environment, the image sensor 312 can cause the signals to bypass the image obfuscating circuitry 314 and continue to the image processing circuitry 316. In some examples, the image sensor 312 includes a reduced quantity of the light detectors to capture light in the viewing environment at a reduced resolution. In some examples, the image sensor 312 is instantiated by processor circuitry executing instructions and/or configured to perform operations such as those represented by the flowchart of FIG. 8.

In FIG. 3, the image obfuscating circuitry 314 adjusts or modifies the signals generated by the light detectors of the image sensor 312 to obfuscate the viewing environment. In some examples, the image obfuscating circuitry 314 causes signals associated with a set of the light detectors (e.g., a 3×3 block of the light detectors, a 9×9 block of the light detectors, etc.) to match each other such that the signals represent a single color. For example, the image obfuscating circuitry 314 average the voltages of the respective signals to cause the signals to match or be within a certain voltage of each other. Alternatively, the image obfuscating circuitry 314 can cause one of the signals (e.g., a signal associated with a central light detector within the set, a minimum voltage signal, a maximum voltage signal, etc.) to override and/or replace a remainder of the signals from the light detectors in the set. In this manner, the image obfuscating circuitry 314 causes the viewing environment to be represented by fewer signals from the image sensor 312. As such, the image obfuscating circuitry 314 can cause a resolution of the viewing environment to be reduced, which can cause the viewers in the viewing environment to be humanly unrecognizable. Furthermore, by reducing a quantity and/or a variance in the signals that are to be processed by the image processing circuitry 316 to produce a recording of the viewing environment, the image obfuscating circuitry 314 enables the image processing circuitry 316 to produce frames of the recording at a faster rate.

In some examples, the image obfuscating circuitry 314 determines the signals to modify and/or a manner in which to modify the signals based on voltages of the respective signals. For example, image obfuscating circuitry 314 can identify a pattern of signals that correspond to eyes, or another feature, of the viewer and, in turn, cause certain signals corresponding to certain features to override other signals. Specifically, signals within the pattern corresponding to irises of the eyes can override other signals corresponding to areas around the irises such that the eye color of the viewer can be emphasized by the image obfuscating circuitry 314 while the eyes themselves are not depicted. Thus, the image obfuscating circuitry 314 can enable certain features of the viewer to be emphasized while causing the viewer to become humanly unrecognizable. In some examples, the image obfuscating circuitry 314 is instantiated by processor circuitry executing instructions and/or configured to perform operations such as those represented by the flowchart of FIG. 8.

Additionally or alternatively, the image obfuscating circuitry 314 can include different voltage amplifiers (e.g., different MOSFETs, amplifiers that produce different voltage gains, etc.). Specifically, the different voltage amplifiers can be communicatively coupled to the light detectors in the image sensor 312. As such, a variance in the voltage gains produced by the amplifiers can alter the voltages produced by the light detectors and, in turn, obfuscate the image. That is, the image obfuscating circuitry 314 can modify signals from a first light detector and a second light detector receiving a same color (e.g., receiving the same electromagnetic signal indicative of the same color) such that the signals do not represent the same color. Thus, the image obfuscating circuitry 314 can create noise in the recording of the viewing environment that helps reduce a recognizability of the viewer(s) through human eyes.

In FIG. 3, the image processing circuitry 316 analyzes the signals generated by the image sensor 312 and/or the image obfuscating circuitry 314 to produce an image (e.g., a recording of the viewing environment). For example, the image processing circuitry 316 can determine colors in the image based on the signals. Further, the image processing circuitry 316 can determine where to depict the colors based on a location of the corresponding light detector with which the signal is associated. In some examples, the image obfuscating circuitry 314 reduces the processing resources that the image processing circuitry 316 utilizes to generate the image by causing a signal from one light detector to be representative of a set of the light detectors. That is, the image processing circuitry 316 can analyze fewer signals to generate the obfuscated image of the viewing environment. In some examples, the image processing circuitry 316 is instantiated by processor circuitry executing instructions and/or configured to perform operations such as those represented by the flowchart of FIG. 8.

In FIG. 3, the feature identifying circuitry 318 analyzes the obfuscated viewing environment produced by the camera 308. Specifically, the feature identifying circuitry 318 identifies features of the viewer(s) in the obfuscated viewing environment produced by the image processing circuitry 316. For example, the feature identifying circuitry 318 can identify one or more silhouette(s) of the viewer(s). In turn, the feature identifying circuitry 318 can identify a facial region(s) of the viewer(s) in response to identifying the silhouette(s) of the viewer(s). In some examples, the feature identifying circuitry 318 identifies a size and/or proportions of areas of the viewer(s) based on the silhouette.

In FIG. 3, the feature identifying circuitry 318 causes the camera 308 to magnify (e.g., zoom in on) the identified facial region of the viewer. In some examples, the feature identifying circuitry 318 identifies a face size of the viewer. In some examples, the feature identifying circuitry 318 identifies at least one of a size, a shape, a color, or a relative location of eyebrows of the viewer. In some examples, the feature identifying circuitry 318 identifies at least one of a size, a shape, a color, or a relative location of hair of the viewer. In some examples, the feature identifying circuitry 318 identifies at least one of a position, a size, a shape, or a color of eyes of the viewer. In some examples, the feature identifying circuitry 318 identifies at least one of a position, a shape, or a size of a nose of the viewer. In some examples, the feature identifying circuitry 318 is instantiated by processor circuitry executing instructions and/or configured to perform operations such as those represented by the flowchart of FIG. 8.

In FIG. 3, the motion detecting circuitry 320 detects motion within the obfuscated viewing environment based on changes in the images generated by the image processing circuitry 316. Further, the motion detecting circuitry 320 can cause (e.g., trigger) the feature identifying circuitry 318 to search for the silhouette(s) in response to detecting the motion. In some examples, the motion detecting circuitry 320 is instantiated by processor circuitry executing instructions and/or configured to perform operations such as those represented by the flowchart of FIG. 8.

In FIG. 3, the panelist identifying circuitry 322 can determine whether the identified feature(s) of the viewer is/are associated with a panelist(s). In FIG. 3, one or more features of the panelist(s) associated with the media presentation device 116 can be stored in the panelist identification database 324, as discussed in further detail below. The panelist identifying circuitry 322 can compare the identified feature(s) of the viewer to the feature(s) associated with the panelist(s) in the panelist identification database 324. In response to the identified feature(s) of the viewer matching the feature(s) associated with a panelist, the panelist identifying circuitry 322 can determine the viewer is the panelist. In turn, the panelist identifying circuitry 322 can provide an indication representative of the panelist participating in the viewing session to the report generating circuitry 332. In some examples, the panelist identifying circuitry 322 transmits another signal to the report generating circuitry 332 when the panelist exits the viewing environment. In some examples, the panelist identifying circuitry 322 is instantiated by processor circuitry executing instructions and/or configured to perform operations such as those represented by the flowchart of FIG. 8.

In FIG. 3, in response to the identified feature(s) of the viewer not matching the feature(s) associated with a panelist (e.g., previously identified for the panelist), the panelist identifying circuitry 322 causes the viewer prompting circuitry 326 to present a prompt to the viewer. In turn, the viewer prompting circuitry 326 can cause the prompt to be presented to the viewer. For example, the viewer prompting circuitry 326 can cause the prompt to be displayed to the user via the media presenting circuitry 306. Further, the viewer prompting circuitry 326 can cause the viewer to select between panelists registered to the media presentation device 116 and/or one or more guest options. In some examples, the viewer prompting circuitry 326 is instantiated by processor circuitry executing instructions and/or configured to perform operations such as those represented by the flowchart of FIG. 8.

In FIG. 3, in response to the viewer providing a response to the prompt, the profile generating circuitry 328 can update the feature(s) associated with the panelist(s) in the panelist identification database 324. Specifically, when the response to the prompt indicates the viewer is Panelist A, the profile generating circuitry 328 can cause the feature(s) identified by the feature identifying circuitry 318 to be linked to Panelist A in the panelist identification database 324. Accordingly, when the feature(s) are identified in a subsequent instance, the feature(s) will be linked to Panelist A in the panelist identification database 324 and, thus, the viewer can be identified without being prompted. In some examples, when the response to the response to the prompt indicates the viewer is a guest of the panelist(s), the profile generating circuitry 328 can build a profile for the guest in the panelist identification database 324 including the identified feature(s). Accordingly, the panelist identifying circuitry 322 can determine the guest is the viewer in response to the same feature(s) being identified in a subsequent instance. In some examples, the profile generating circuitry 328 is instantiated by processor circuitry executing instructions and/or configured to perform operations such as those represented by the flowchart of FIG. 8.

As such, the metering circuitry 118 may utilize a training period (e.g., 1 week, 2 weeks, 3 weeks, etc.) to generate profiles for the panelist(s) and/or an encountered guest(s) in the panelist identification database 324. Thus, in response to the training period ending, the metering circuitry 118 can identify the panelist(s) accurately and with fewer interruptions to the viewing session.

In FIG. 3, the signature identifying circuitry 330 identifies the signature presented by the media presentation device 116. For example, the signature identifying circuitry 330 can identify the watermark presented by the media presenting circuitry 306. In FIG. 3, the metering circuitry 118 receives the signature-identifier database 210 via the network 108. As such, the signature identifying circuitry 330 can compare the identified signature to signatures stored in the signature-identifier database 210. In turn, the signature identifying circuitry 330 can determine an identifier associated with the identified signature in the signature-identifier database 210. The signature identifying circuitry 330 transmits the identifier associated with the signature presented during the viewing session to the report generating circuitry 332. In some examples, the signature identifying circuitry 330 is instantiated by processor circuitry executing instructions and/or configured to perform operations such as those represented by the flowchart of FIG. 8.

In FIG. 3, the report generating circuitry 332 generates viewing session reports. For example, the viewing session reports can include the identifier associated with the respective viewing session, an identification value of the panelist(s), an indication of the guest(s) that encountered the media, and/or a time of the viewing session. In some examples, the report generating circuitry 332 generates timestamps for the panelist(s) and/or the guest(s) in response to the panelist identifying circuitry 322 indicating that the panelist(s) and/or the guest(s) entered or left the viewing environment. As such, specific media presented while the panelist(s) and/or the guest(s) were in the viewing environment can be linked to the panelist(s) and/or the guest(s). Further, the report generating circuitry 332 provides the generated viewing session reports to the report transmitting circuitry 334. In turn, the report transmitting circuitry 334 can transmit the generated viewing session reports to the audience measurement entity 106 via the network 108. In some examples, the report generating circuitry 332 is instantiated by processor circuitry executing instructions and/or configured to perform operations such as those represented by the flowchart of FIG. 8.

Figure 4:
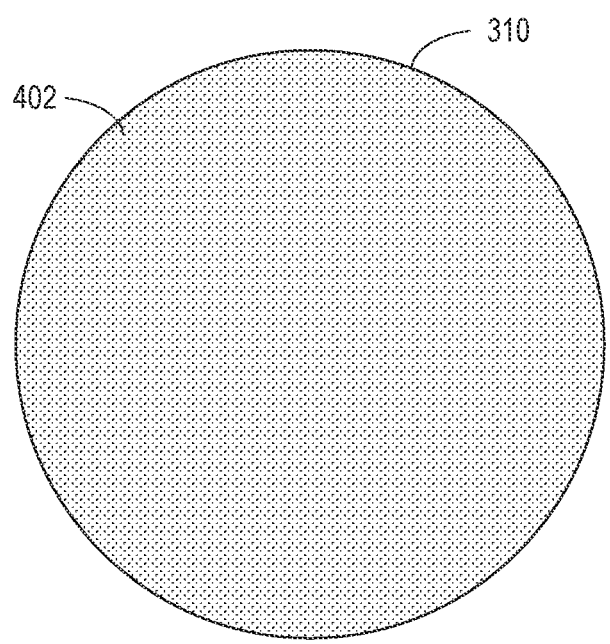
FIG. 4 illustrates an example obfuscating lens associated with the example media presentation environment of FIG. 3.

FIG. 4 illustrates the example obfuscating lens 310 of the camera 308 of FIG. 3. The obfuscating lens 310 can be glass, plastic, or any other material that is at least partially transparent. The obfuscating lens 310 includes a surface 402 (e.g., an obfuscating surface) that faces a viewing environment. Accordingly, reflected light rays in the viewing environment enter the obfuscating lens 310 through the surface 402. In some examples, the surface 402 has a surface roughness (e.g., an average surface roughness, a height profile of the surface 402 of the obfuscating lens 310, etc.) that satisfies (e.g., is greater than or equal to) a first roughness threshold. For example, the first roughness threshold can correspond to a surface roughness that would sufficiently distort viewers in a viewing environment such that the viewers are humanly unrecognizable in the recording generated by the camera 308. Additionally, the average surface roughness of the obfuscating lens 310 can satisfy (e.g., be less than or equal to) a second roughness threshold. For example, the second roughness threshold can define a maximum roughness at which features of the viewers are identifiable by the feature identifying circuitry 318 of FIG. 3. In some examples, the second roughness threshold depends on a size of the viewing environment. Accordingly, the surface of the obfuscating lens 310 can obfuscate the recording captured by the camera 308 while enabling the recording to present features of the viewer(s) that are identifiable by the feature identifying circuitry 318.

In FIG. 4, the roughness in the surface 402 of the obfuscating lens 310 can be formed via surface treatment. For example, the obfuscating lens 310 can be sanded and/or sandblasted to abrade the surface 402. Additionally or alternatively, the obfuscating lens 310 can be sprayed with one or more chemicals that deform the surface 402. Specifically, the chemical(s) erode or wear down the surface 402 of the obfuscating lens 310 to form the roughness that satisfies the first and second roughness thresholds.

In some examples, the surface 402 of the obfuscating lens 310 is clouded or fogged in addition to, or instead of, having the roughness that satisfies the first and second roughness thresholds. For example, the surface 402 can be sprayed with one or more chemicals that form a frost or cloudiness on the glass or plastic. In some examples, the surface 402 is formed by a thin layer of partially transparent material that is placed over the lens. Accordingly, the surface 402 of the obfuscating lens 310 may partially inhibit an ability of the obfuscating lens 310 to focus light rays from the viewing environment onto the image sensor 312 of FIG. 3. For example, the surface 402 of the obfuscating lens 310 can prevent light rays in certain areas from passing through the obfuscating lens 310 and/or alter a direction of travel of the light rays. Thus, the image sensor 312 may receive a blurred or distorted depiction of the viewing environment. Additionally or alternatively, the obfuscating lens 310 can obfuscate the viewing environment in any other manner, such as through a prescription and/or a spatial relationship with the image sensor 312.

Figure 5:
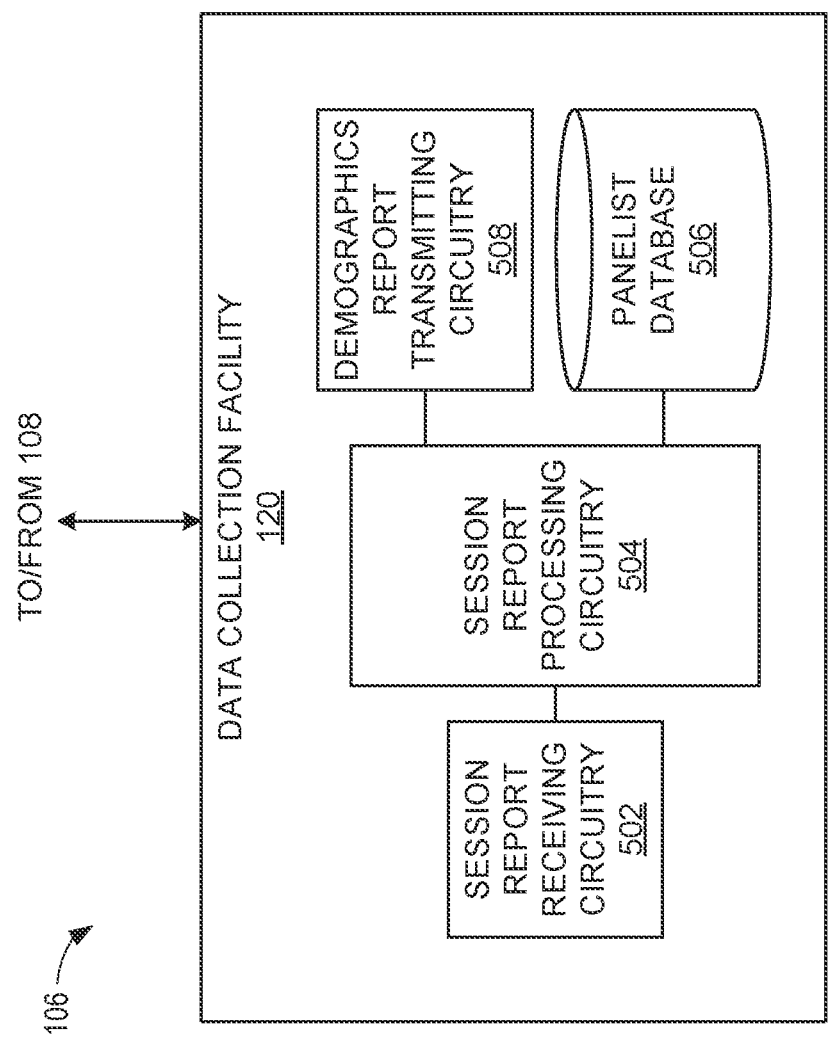
FIG. 5 is a block diagram of an example audience measurement entity of the example audience analysis system of FIG. 1.

FIG. 5 is a block diagram of the example audience measurement entity 106 of FIG. 1. In FIG. 5, the audience measurement entity 106 includes the data collection facility 120 of FIG. 1. In FIG. 5, the data collection facility 120 includes session report receiving circuitry 502, session report processing circuitry 504, a panelist database 506, and demographics report transmitting circuitry 508.

In FIG. 5, the session report receiving circuitry 502 receives a report associated with a viewing session via the network 108. For example, the session report receiving circuitry 502 can receive the viewing session report from the metering circuitry 118 via the network 108. In turn, the session report receiving circuitry 502 can relay information in the viewing session report to the session report processing circuitry 504. In some examples, the session report receiving circuitry 502 is instantiated by processor circuitry executing instructions and/or configured to perform operations such as those represented by the flowchart of FIG. 9.

In FIG. 5, the session report processing circuitry 504 analyzes the information presented in the viewing session report to determine demographics associated with the viewing session. For example, the session report processing circuitry 504 can identify an identification value(s) of the panelist(s) that encountered the viewing session. Further, the session report processing circuitry 504 can associate a time that the respective panelist(s) participated in the viewing session with the demographic information associated with the panelist(s). Additionally, the session report processing circuitry 504 can identify the identifier associated the viewing session via the viewing session report. In some examples, the session report processing circuitry 504 is instantiated by processor circuitry executing instructions and/or configured to perform operations such as those represented by the flowchart of FIG. 9.

In FIG. 5, the panelist database 506 stores demographic information for registered panelists with respective panelist identification values associated with the registered panelists. Additionally, the panelist database 506 can include a fingerprint of media devices associated with the panelists. As such, the session report processing circuitry 504 can perform a look-up of the identification value(s) of the panelist(s) listed in the viewing session report in the panelist database 506 to determine the demographic information associated with the panelist(s) and the fingerprint of media devices associated with the panelist(s).

In FIG. 5, the session report processing circuitry 504 generates a session demographics report including the demographic information associated with the panelist(s), the fingerprint of media devices associated with the panelist, the time of the viewing session, the time that the respective panelist(s) encountered media presented during the viewing session, and the identifier associated with the viewing session. In turn, the session report processing circuitry 504 can provide the session demographics report to the demographics report transmitting circuitry 508.

In FIG. 5, the demographics report transmitting circuitry 508 transmits the session demographics report to the network 108. For example, the demographics report transmitting circuitry 508 can transmit the session demographics report to the media provider 102 via the network 108 to enable the media provider 102 to determine demographics of viewers that encounter certain media. In some examples, the demographics report transmitting circuitry 508 is instantiated by processor circuitry executing instructions and/or configured to perform operations such as those represented by the flowchart of FIG. 9.

In some examples, the metering circuitry 118 includes means for capturing. For example, the means for capturing may be implemented by the camera 308 of FIG. 3. In some examples, the camera 308 of FIG. 3 may be implemented by machine executable instructions such as those implemented by at least block 804 of FIG. 8 executed by processor circuitry, which may be implemented by the example processor circuitry 1212 of FIG. 12, the example microprocessor 1400 of FIG. 14, and/or the example Field Programmable Gate Array (FPGA) circuitry 1500 of FIG. 15. In other examples, the camera 308 is implemented by other hardware logic circuitry, hardware implemented state machines, and/or any other combination of hardware, software, and/or firmware. For example, the camera 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to perform the corresponding operation without executing software or firmware, but other structures are likewise appropriate.

In some examples, the metering circuitry 118 includes means for obfuscating. For example, the means for obfuscating may be implemented by the obfuscating lens 310 of FIGS. 3 and 4 and/or the image obfuscating circuitry 314 of FIG. 3. In some examples, the image obfuscating circuitry 314 of FIG. 3 may be implemented by machine executable instructions such as those implemented by at least block 802 of FIG. 8 executed by processor circuitry, which may be implemented by the example processor circuitry 1212 of FIG. 12, the example microprocessor 1400 of FIG. 14, and/or the example Field Programmable Gate Array (FPGA) circuitry 1500 of FIG. 15. In other examples, the image obfuscating circuitry 314 is implemented by other hardware logic circuitry, hardware implemented state machines, and/ or any other combination of hardware, software, and/or firmware. For example, the image obfuscating circuitry 314 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to perform the corresponding operation without executing software or firmware, but other structures are likewise appropriate.

In some examples, the metering circuitry 118 includes means for identifying features of a viewer. For example, the means for identifying features of a viewer may be implemented by the feature identifying circuitry 318 of FIG. 3. In some examples, the feature identifying circuitry 318 of FIG. 3 may be implemented by machine executable instructions such as those implemented by at least block 808 of FIG. 8 executed by processor circuitry, which may be implemented by the example processor circuitry 1212 of FIG. 12, the example microprocessor 1400 of FIG. 14, and/or the example Field Programmable Gate Array (FPGA) circuitry 1500 of FIG. 15. In other examples, the feature identifying circuitry 318 is implemented by other hardware logic circuitry, hardware implemented state machines, and/or any other combination of hardware, software, and/or firmware. For example, the feature identifying circuitry 318 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to perform the corresponding operation without executing software or firmware, but other structures are likewise appropriate.

In some examples, the metering circuitry 118 includes means for identifying a panelist. For example, the means for identifying a panelist may be implemented by the panelist identifying circuitry 322 of FIG. 3. In some examples, the panelist identifying circuitry 322 of FIG. 3 may be implemented by machine executable instructions such as those implemented by at least blocks 810, 812, of FIG. 8 executed by processor circuitry, which may be implemented by the example processor circuitry 1212 of FIG. 12, the example microprocessor 1400 of FIG. 14, and/or the example Field Programmable Gate Array (FPGA) circuitry 1500 of FIG. 15. In other examples, the panelist identifying circuitry 322 is implemented by other hardware logic circuitry, hardware implemented state machines, and/or any other combination of hardware, software, and/or firmware. For example, the panelist identifying circuitry 322 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to perform the corresponding operation without executing software or firmware, but other structures are likewise appropriate.

In some examples, the metering circuitry 118 includes means for prompting. For example, the means for prompting may be implemented by the viewer prompting circuitry 326 of FIG. 3. In some examples, the viewer prompting circuitry 326 of FIG. 3 may be implemented by machine executable instructions such as those implemented by at least block 814 of FIG. 8 executed by processor circuitry, which may be implemented by the example processor circuitry 1212 of FIG. 12, the example microprocessor 1400 of FIG. 14, and/or the example Field Programmable Gate Array (FPGA) circuitry 1500 of FIG. 15. In other examples, the viewer prompting circuitry 326 is implemented by other hardware logic circuitry, hardware implemented state machines, and/or any other combination of hardware, software, and/or firmware. For example, the viewer prompting circuitry 326 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to perform the corresponding operation without executing software or firmware, but other structures are likewise appropriate.

In some examples, the metering circuitry 118 includes means for generating viewer profiles. For example, the means for generating viewer profiles may be implemented by the profile generating circuitry 328 of FIG. 3. In some examples, the profile generating circuitry 328 of FIG. 3 may be implemented by machine executable instructions such as those implemented by at least block 818 of FIG. 8 executed by processor circuitry, which may be implemented by the example processor circuitry 1212 of FIG. 12, the example microprocessor 1400 of FIG. 14, and/or the example Field Programmable Gate Array (FPGA) circuitry 1500 of FIG. 15. In other examples, the profile generating circuitry 328 is implemented by other hardware logic circuitry, hardware implemented state machines, and/or any other combination of hardware, software, and/or firmware. For example, the profile generating circuitry 328 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to perform the corresponding operation without executing software or firmware, but other structures are likewise appropriate.

In some examples, the metering circuitry 118 includes means for detecting motion. For example, the means for detecting motion may be implemented by the motion detecting circuitry 320 of FIG. 3. In some examples, the motion detecting circuitry 320 of FIG. 3 may be implemented by machine executable instructions such as those implemented by at least block 806 of FIG. 8 executed by processor circuitry, which may be implemented by the example processor circuitry 1212 of FIG. 12, the example microprocessor 1400 of FIG. 14, and/or the example Field Programmable Gate Array (FPGA) circuitry 1500 of FIG. 15. In other examples, the motion detecting circuitry 320 is implemented by other hardware logic circuitry, hardware implemented state machines, and/or any other combination of hardware, software, and/or firmware. For example, the motion detecting circuitry 320 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to perform the corresponding operation without executing software or firmware, but other structures are likewise appropriate.

While an example manner of implementing the media provider 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example signature processing circuitry 110, the example session processing circuitry 112, the example viewer processing circuitry 114, the example signature generating circuitry 202, the example identifier generating circuitry 204, the example signature-identifier linking circuitry 206, the example signature-identifier transmitting circuitry 208, the example signature identifier database 210, the example signature transmitting circuitry 212, the example session identifying circuitry 214, the example session correlating circuitry 216, the example report processing circuitry 218, the example media identifying circuitry 220, the example media identification database 222, the example media correlating circuitry 224, the example media demographics database 226, and/or, more generally, the example media provider 102 of FIG. 1, may be implemented by hardware, software, firmware, and/or any combination of hardware, software, and/or firmware. Thus, for example, any of the example signature processing circuitry 110, the example session processing circuitry 112, the example viewer processing circuitry 114, the example signature generating circuitry 202, the example identifier generating circuitry 204, the example signature-identifier linking circuitry 206, the example signature-identifier transmitting circuitry 208, the example signature identifier database 210, the example signature transmitting circuitry 212, the example session identifying circuitry 214, the example session correlating circuitry 216, the example report processing circuitry 218, the example media identifying circuitry 220, the example media identification database 222, the example media correlating circuitry 224, the example media demographics database 226, and/or, more generally, the example media provider 102 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the signature processing circuitry 110, the example session processing circuitry 112, the example viewer processing circuitry 114, the example signature generating circuitry 202, the example identifier generating circuitry 204, the example signature-identifier linking circuitry 206, the example signature-identifier transmitting circuitry 208, the example signature identifier database 210, the example signature transmitting circuitry 212, the example session identifying circuitry 214, the example session correlating circuitry 216, the example report processing circuitry 218, the example media identifying circuitry 220, the example media identification database 222, the example media correlating circuitry 224, and/or the example media demographics database 226 is/are hereby expressly defined to include a non-transitory computer readable storage device or storage disk such as a memory, a digital versatile disk (DVD), a compact disk (CD), a Blu-ray disk, etc., including the software and/or firmware. Further still, the example media provider 102 of FIG. 1 may include one or more elements, processes, and/or devices in addition to, or instead of, those illustrated in FIG. 2, and/or may include more than one of any or all of the illustrated elements, processes and devices.

While an example manner of implementing the media presentation environment 104 of FIG. 1 is illustrated in FIG. 3, one or more of the elements, processes, and/or devices illustrated in FIG. 3 may be combined, divided, re-arranged, omitted, eliminated, and/or implemented in any other way. Further, the example media presentation device 116, the example metering circuitry 118, the example session transmitting circuitry 302, the signature processing circuitry 304, the example media presenting circuitry 306, the example camera 308, the example image obfuscating lens 310, the example image sensor 312, the image obfuscating 314, the example image processing circuitry 316, the example feature identifying circuitry 318, the example motion detecting circuitry 320, the example panelist identifying circuitry 322, the example panelist identification database 324, the example viewer prompting circuitry 326, the example profile generating circuitry 328, the example signature identifying circuitry 330, the example report generating circuitry 332, the example report transmitting circuitry 334, and/or, more generally, the example media presentation environment 104 of FIG. 1, may be implemented by hardware, software, firmware, and/or any combination of hardware, software, and/or firmware. Thus, for example, any of the example the example media presentation device 116, the example metering circuitry 118, the example session transmitting circuitry 302, the signature processing circuitry 304, the example media presenting circuitry 306, the example camera 308, the example image obfuscating lens 310, the example image sensor 312, the image obfuscating 314, the example image processing circuitry 316, the example feature identifying circuitry 318, the example motion detecting circuitry 320, the example panelist identifying circuitry 322, the example panelist identification database 324, the example viewer prompting circuitry 326, the example profile generating circuitry 328, the example signature identifying circuitry 330, the example report generating circuitry 332, the example report transmitting circuitry 334, and/or, more generally, the example media presentation environment 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example the example media presentation device 116, the example metering circuitry 118, the example session transmitting circuitry 302, the signature processing circuitry 304, the example media presenting circuitry 306, the example camera 308, the example image obfuscating lens 310, the example image sensor 312, the image obfuscating 314, the example image processing circuitry 316, the example feature identifying circuitry 318, the example motion detecting circuitry 320, the example panelist identifying circuitry 322, the example panelist identification database 324, the example viewer prompting circuitry 326, the example profile generating circuitry 328, the example signature identifying circuitry 330, the example report generating circuitry 332, and/or the example report transmitting circuitry 334 is/are hereby expressly defined to include a non-transitory computer readable storage device or storage disk such as a memory, a digital versatile disk (DVD), a compact disk (CD), a Blu-ray disk, etc., including the software and/or firmware. Further still, the example media presentation environment 104 of FIG. 1 may include one or more elements, processes, and/or devices in addition to, or instead of, those illustrated in FIG. 3, and/or may include more than one of any or all of the illustrated elements, processes and devices.

While an example manner of implementing the audience measurement entity 106 of FIG. 1 is illustrated in FIG. 5, one or more of the elements, processes, and/or devices illustrated in FIG. 2 may be combined, divided, re-arranged, omitted, eliminated, and/or implemented in any other way. Further, the example data collection facility 120, the example session report receiving circuitry 502, the example session report processing circuitry 504, the example panelist database 506, the example demographics report transmitting circuitry 508, and/or, more generally, the example audience measurement entity 106 of FIG. 1, may be implemented by hardware, software, firmware, and/or any combination of hardware, software, and/or firmware. Thus, for example, any of the example the example data collection facility 120, the example session report receiving circuitry 502, the example session report processing circuitry 504, the example panelist database 506, the example demographics report transmitting circuitry 508, and/or, more generally, the example audience measurement entity 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example the example data collection facility 120, the example session report receiving circuitry 502, the example session report processing circuitry 504, the example panelist database 506, and/or the example demographics report transmitting circuitry 508 s/are hereby expressly defined to include a non-transitory computer readable storage device or storage disk such as a memory, a digital versatile disk (DVD), a compact disk (CD), a Blu-ray disk, etc., including the software and/or firmware. Further still, the example audience measurement entity 102 of FIG. 1 may include one or more elements, processes, and/or devices in addition to, or instead of, those illustrated in FIG. 5, and/or may include more than one of any or all of the illustrated elements, processes and devices.

Figure 6:
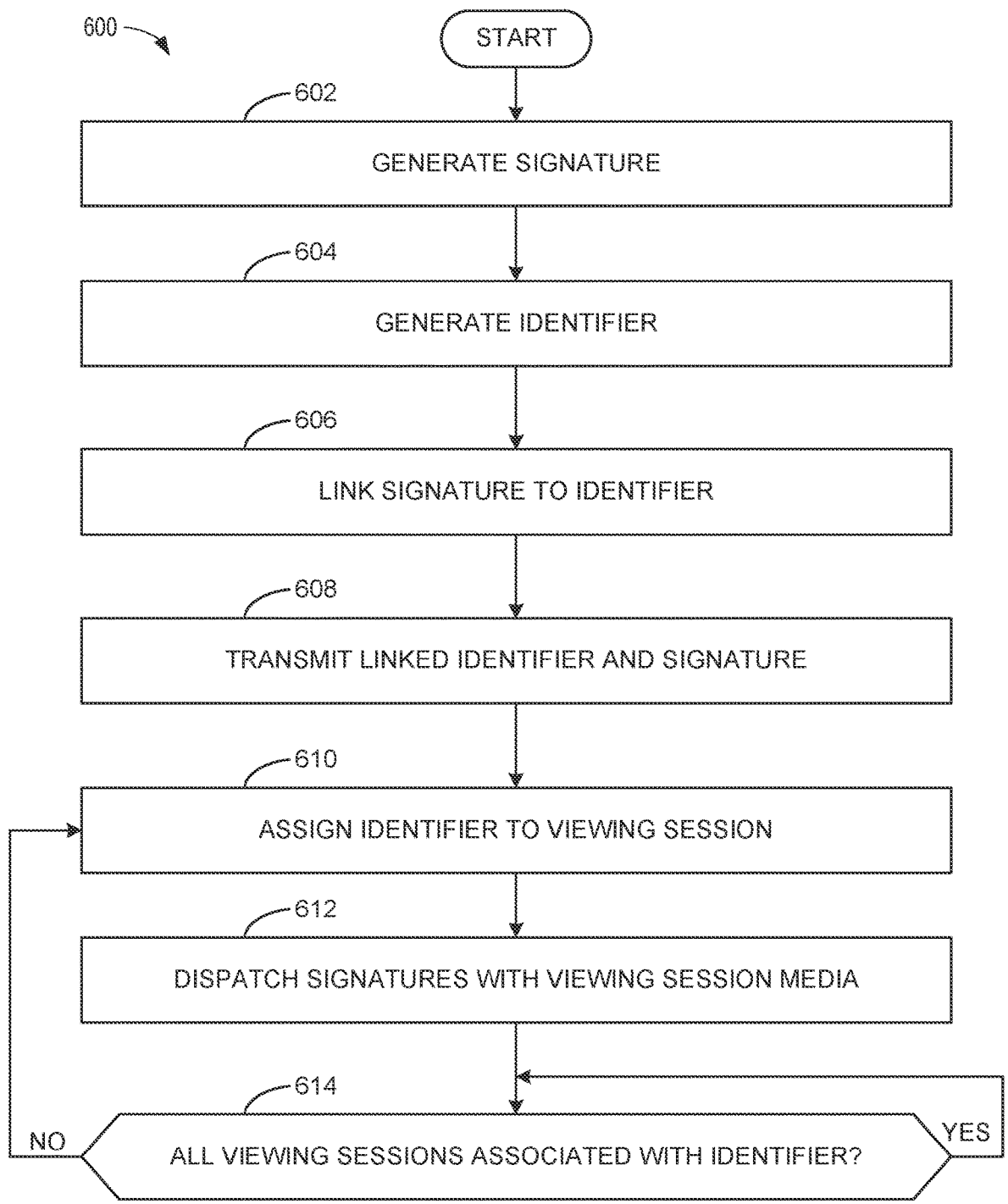
FIG. 6 is a first flowchart representative of example computer readable instructions that may be executed to implement the example media provider of FIG. 2 of the example audience analysis system of FIG. 1.
Figure 7:
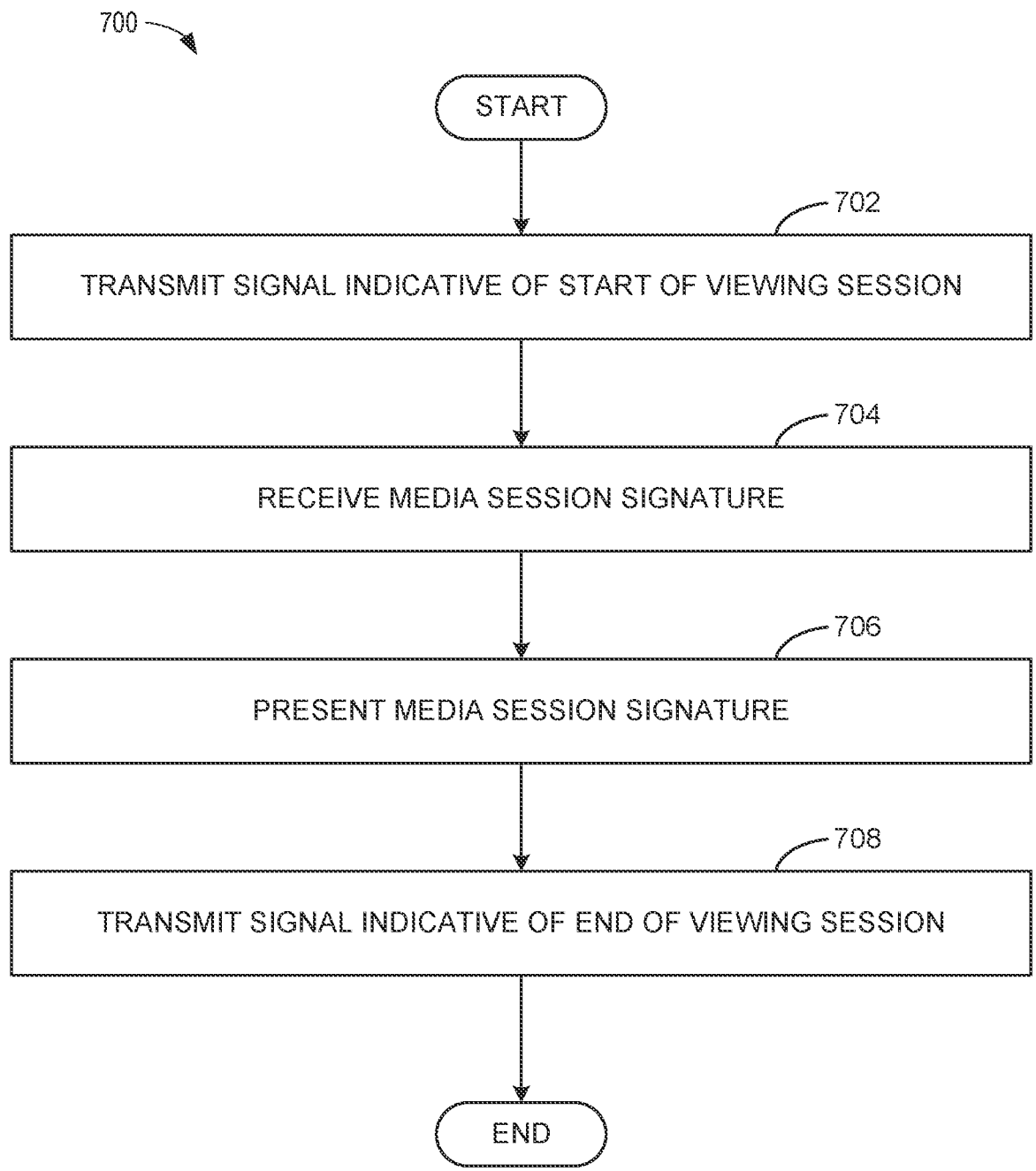
FIG. 7 is a first flowchart representative of example computer readable instructions that may be executed to implement the example media presentation environment of FIG. 3 of the example audience analysis system of FIG. 1.
Figure 8:
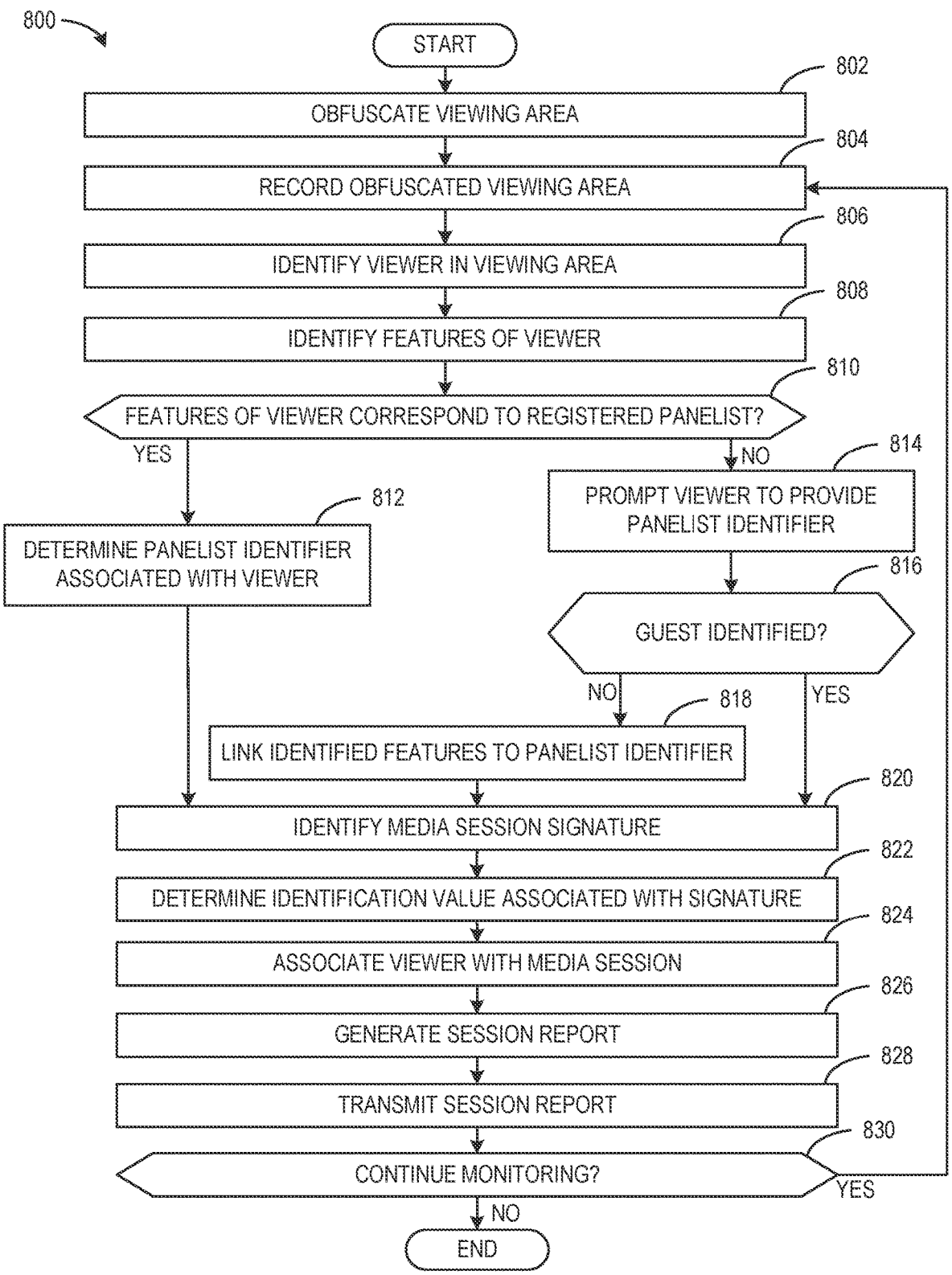
FIG. 8 is a second flowchart representative of example computer readable instructions that may be executed to implement the example media presentation environment of FIG. 3 of the example audience analysis system of FIG. 1.
Figure 9:
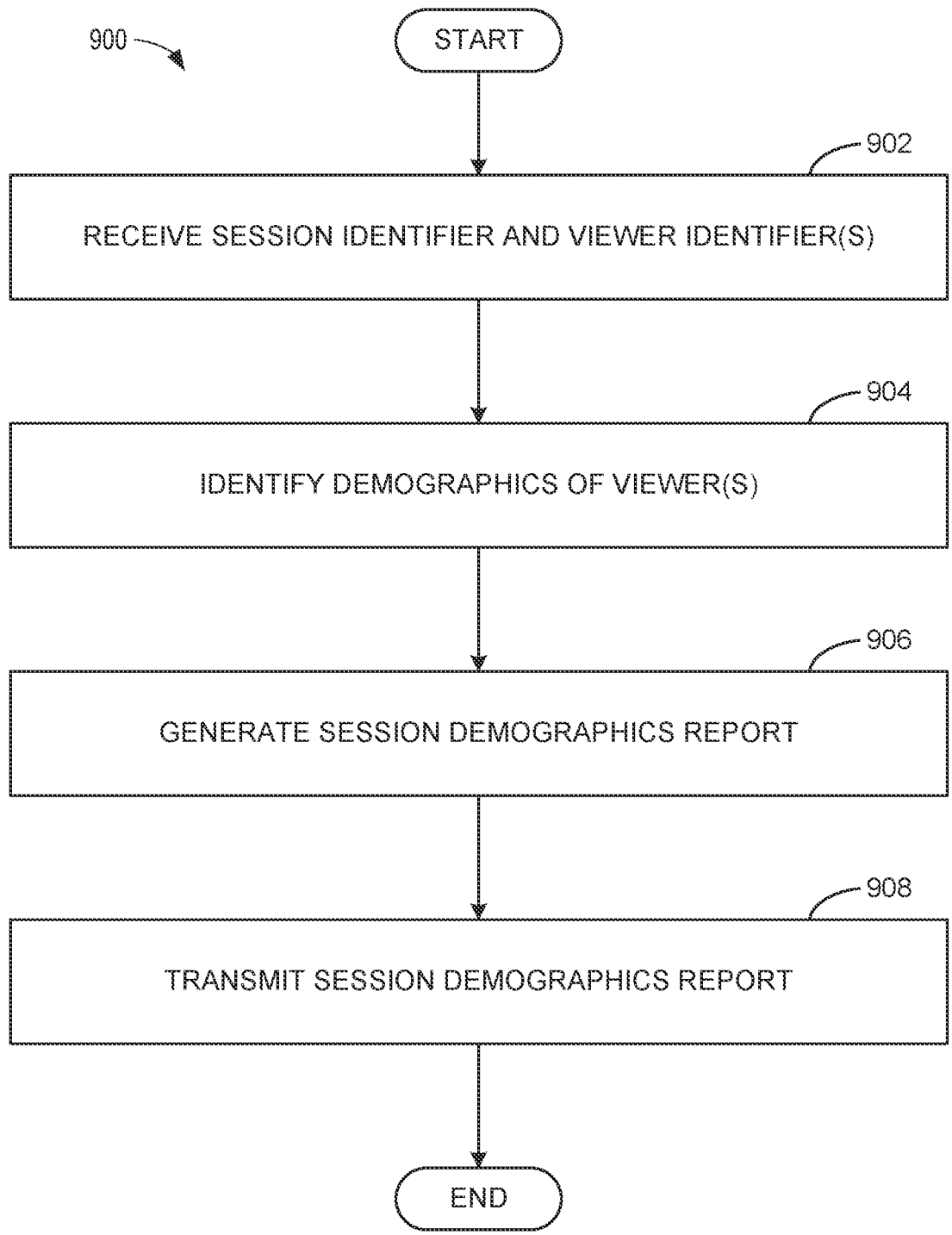
FIG. 9 is a flowchart representative of example computer readable instructions that may be executed to implement the example audience measurement entity of FIG. 4 of the example audience analysis system of FIG. 1.
Figure 10:
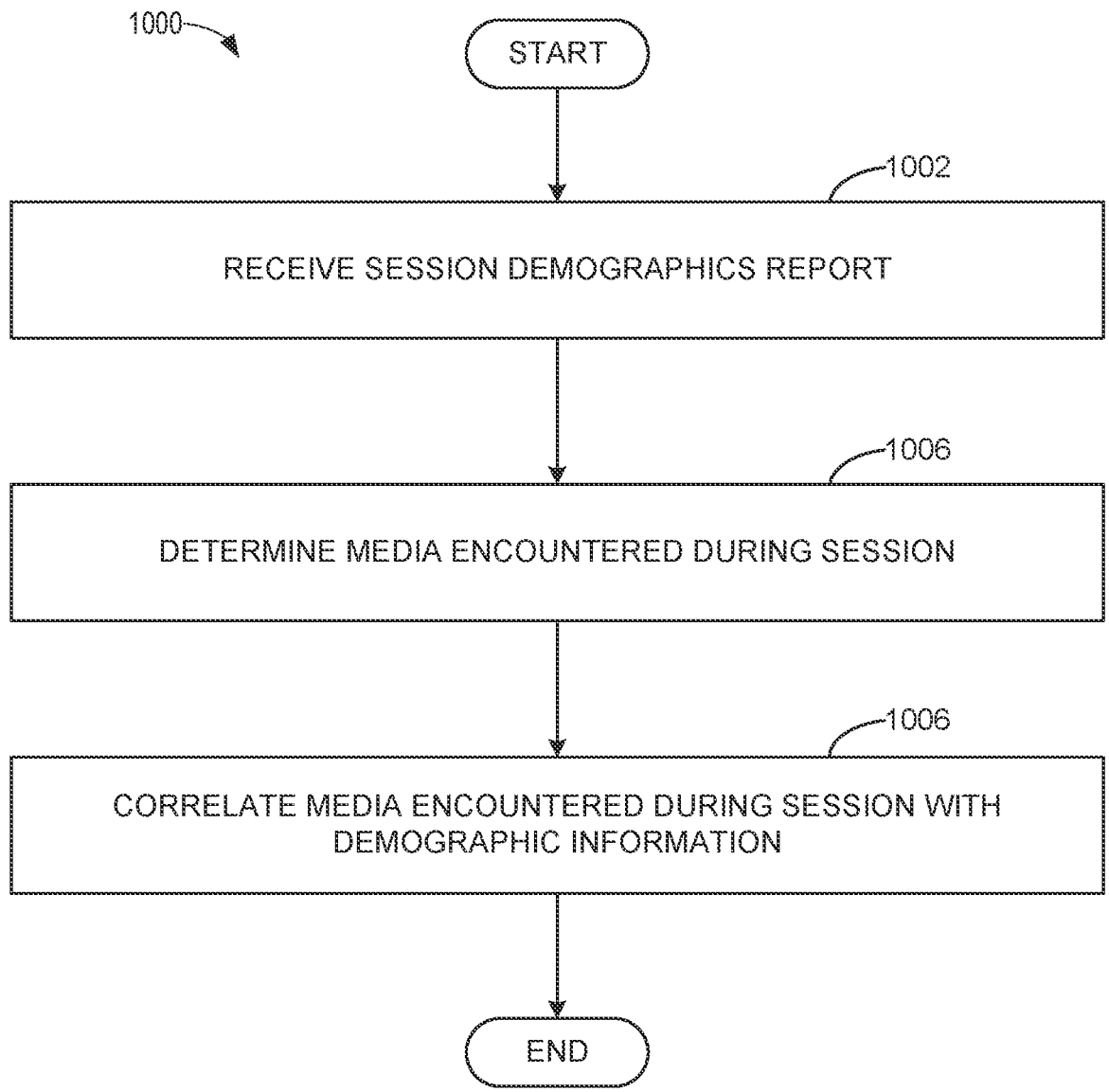
FIG. 10 is a second flowchart representative of example computer readable instructions that may be executed to implement the example media provider of FIG. 2 of the example audience analysis system of FIG. 1.

Flowcharts representative of example hardware logic circuitry, machine readable instructions, hardware implemented state machines, and/or any combination thereof for implementing the media provider 102 of FIGS. 1 and 2 are shown in FIGS. 6 and 10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 14 and/or 15. Flowcharts representative of example hardware logic circuitry, machine readable instructions, hardware implemented state machines, and/or any combination thereof for implementing the media presentation environment 104 of FIGS. 1 and 3 are shown in FIGS. 7 and 8. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 14 and/or 15. A Flowchart representative of example hardware logic circuitry, machine readable instructions, hardware implemented state machines, and/or any combination thereof for implementing the audience measurement entity 106 of FIGS. 1 and 5 is shown in FIG. 9. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 6-10, many other methods of implementing the example audience analysis system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to generate and assign identifiable signatures to media viewing sessions. The machine readable instructions and/or operations 600 of FIG. 6 begin at block 602, at which the media provider 102 (FIGS. 1 and 2) generates signatures for viewing sessions. For example, the signature processing circuitry 110 (FIGS. 1 and 2) can generate the signatures to be embedded in media of viewing sessions. In some examples, the signature generating circuitry 202 (FIG. 2) generates the signatures in the form of watermarks.

At block 604, the media provider 102 generates identifiers for the viewing sessions. For example, the signature processing circuitry 110 can generate the identifiers for the viewing sessions. In some examples, the identifier generating circuitry 204 (FIG. 2) generates the identifiers in the form of strings of alphanumeric characters, bar codes, and/or any other codes to be assigned to the viewing sessions.

At block 606, the media provider 102 links the signatures to the identifiers. For example, the signature processing circuitry 110 can link a first generated signature to a first generated identifier, a second generated signature to a second generated identifier, etc. In some examples, the signature-identifier linking circuitry 206 (FIG. 2) links the signatures to the respective identifiers.

At block 608, the media provider 102 transmits the linked signatures and identifiers. For example, the signature processing circuitry 110 can transmit the linked signatures and the identifiers to the media presentation environment 104 via the network 108. In some examples, the signature-identifier transmitting circuitry 208 (FIG. 2) transmits the signature-identifier database 210 (FIG. 2) to the metering circuitry 118 (FIGS. 1 and 3) via the network 108.

At block 610, the media provider 102 assigns the identifiers to respective viewing sessions. For example, the session processing circuitry 112 (FIGS. 1 and 2) can assign a first identifier to a first viewing session, a second identifier to a second viewing session, etc. In some examples, the session identifying circuitry 214 (FIG. 2) assigns the first identifier to the first viewing session in response to the media provider 102 receiving a signal indicative of a start of the first viewing session. For example, the signal can be indicative of a request for media to be presented in the first viewing session. In some examples, the session identifying circuitry 214 tracks a queue of the identifiers assigned to the viewing sessions and, in turn, determines which identifiers are available for assignment.

At block 612, the media provider 102 dispatches the signatures with media to be presented during the viewing sessions. For example, session processing circuitry 112 can transmit the signatures with the media to be presented to the media presentation environment 104. In some examples, the signature transmitting circuitry 212 (FIG. 2) transmits the signature with the media to the media presentation device 116. For example, the signature transmitting circuitry 212 can embed the signature associated with the viewing session in the media to be presented.

At block 614, the media provider 102 determines whether all viewing sessions are associated with one of the identifiers. In response to a viewing session not being associated with one of the identifiers, the operations return to block 610. Otherwise, if all the viewing sessions are associated with one of the identifiers, the operations repeat block 614.

FIG. 7 is a flowchart representative of example machine readable instructions and/or example operations 700 that may be executed and/or instantiated by processor circuitry to present signatures with media during viewing sessions. The machine readable instructions and/or operations 700 of FIG. 7 begin at block 702, at which the media presentation device 116 (FIGS. 1 and 3) transmits a signal indicative of a start of a viewing session to the media provider 102 (FIGS. 1 and 2). For example, the media presentation device 116 can transmit the signal indicative of the start of the viewing session to the session processing circuitry 112 (FIGS. 1 and 2) via the network 108 (FIG. 1). In some examples, the session transmitting circuitry 302 (FIG. 3) transmits the signal indicative of the start of the viewing session with an address of the media presentation device 116.

At block 704, the media presentation device 116 receives a media session signature. For example, the media presentation device 116 can receive the media session signature form the session processing circuitry 112 via the network 108. In some examples, the signature processing circuitry 304 (FIG. 3) receives a signal indicative of the media session signature to be presented.

At block 706, the media presentation device 116 presents the media session signature. For example, the media presenting circuitry 306 (FIG. 3) can present the media session signature via a display and/or a speaker.

At block 708, the media presentation device 116 transmits a signal indicative of an end of the viewing session. For example, the media presentation device 116 can transmit the signal indicative of the end of the viewing session. In some examples, session transmitting circuitry 302 transmits the signal indicative of the end of the viewing session.

FIG. 8 is a flowchart representative of example machine readable instructions and/or example operations 800 that may be executed and/or instantiated by processor circuitry to generate viewing session reports. The machine readable instructions and/or operations 800 of FIG. 8 begin at block 802, at which the metering circuitry 118 (FIGS. 1 and 3) obfuscates a viewing area. For example, the camera 308 (FIG. 3) of the metering circuitry 118 can obfuscate the viewing area. In some examples, the obfuscating lens 310 (FIGS. 3 and 4) obfuscates the viewing area. Additionally or alternatively, the image obfuscating circuitry 314 (FIG. 3) can obfuscate the viewing area.

At block 804, the metering circuitry 118 records the obfuscated viewing area. For example, the camera 308 of the metering circuitry 118 can record the obfuscated viewing area. In some examples, the image processing circuitry 316 generates a recording of the obfuscated viewing area in response to the obfuscating lens 310 and/or the image obfuscating circuitry 314 obfuscating the viewing area.

At block 806, the metering circuitry 118 identifies a viewer in the viewing area. In some examples, the feature identifying circuitry 318 (FIG. 3) identifies a silhouette corresponding to the viewer in the obfuscated recording of the viewing area. In some examples, the motion detecting circuitry 320 (FIG. 3) triggers the feature identifying circuitry 318 to search for the silhouette in response to detecting motion in the obfuscated recording of the viewing area.

At block 808, the metering circuitry 118 identifies features of the viewer. In some examples, the feature identifying circuitry 318 identifies one or more features of the viewer. Specifically, the feature identifying circuitry 318 can identify a size of the viewer and/or a size of a particular area of the viewer, such as the face, torso, or limbs of the viewer. Furthermore, the feature identifying circuitry 318 can identify a size, a shape, a color, and/or a relative location of eyebrows of the viewer, a size, a shape, a color, and/or a relative location of hair of the viewer, a position and/or a size of eyes of the viewer, a position and/or a size of a nose of the viewer, etc.

At block 810, the metering circuitry 118 determines whether the identified features of the viewer correspond to a registered panelist. In some examples, the panelist identifying circuitry 322 compares the identified features of the viewer to features in the panelist identification database 324 to determine whether the viewer is a registered panelist. In response to the identified features of the viewer corresponding to a registered panelist, the operations proceed to block 812. In response to the identified features of the viewer not corresponding to a registered panelist, the operations proceed to block 814.

At block 812, the metering circuitry 118 determines a panelist identifier associated with the viewer. For example, the metering circuitry 118 can determine the panelist identifier associated with the viewer based on the identified features of the viewer. In some examples, the panelist identifying circuitry 322 determines the panelist identifier associated with the viewer based on a panelist identifier associated with a panelist having features that match the identified features of the viewer in the panelist identification database 324.

At block 814, the metering circuitry 118 prompts the viewer to provide a panelist identifier. For example, the metering circuitry 118 can cause the media presentation device 116 to display a prompt to the viewer that requests the viewer to select a panelist identifier and/or a guest option. In some examples, the viewer prompting circuitry 326 (FIG. 3) causes the media presentation device 116 to present the prompt to the viewer.

At block 816, the metering circuitry 118 determines whether the viewer identified as a guest. For example, the metering circuitry 118 can determine whether the viewer selected the guest option in response to the media presentation device 116 prompting the viewer. In some examples, the profile generating circuitry 328 (FIG. 3) determines whether the viewer selected a panelist identifier or the guest option. In response to the viewer identifying as a guest, the operations 800 proceed to block 820. Otherwise, the operations 800 proceed to block 818.

At block 818, the metering circuitry 118 links the identified features of the viewer to the panelist identifier indicated by the viewer. In some examples, the profile generating circuitry 328 causes the panelist identifying circuitry 322 to store the identified features with the panelist identifier via the panelist identification database 324.

At block 820, the metering circuitry 118 identifies a media session signature. For example, the signature identifying circuitry 330 (FIG. 3) can identify a media session signature presented by the media presentation device 116 during the media session.

At block 822, the metering circuitry 118 determines an identifier associated with the identified media session signature. In some examples, the metering circuitry 118 receives the signature-identifier database 210 (FIGS. 2 and 3) from the media provider 102 via the network 108. In turn, the signature identifying circuitry 330 can determine the identifier associated with the media session based on the identification value associated with the identified signature in the signature-identifier database 210.

At block 824, the metering circuitry 118 associates the viewer with the media session. For example, the metering circuitry 118 can link the viewer with the media session. In some examples, the panelist identifying circuitry 322 provides an indication representative of the panelist identifier to the report generating circuitry 332 (FIG. 3). In some examples, the panelist identifying circuitry 322 provides an indication representative of the viewer being a guest to the report generating circuitry 332.

At block 826, the metering circuitry 118 generates a session report. For example, the metering circuitry 118 can include the panelist identifier, a guest viewer indication, the identifier associated with the identified media session signature, the start time of the media session, the end time of the media session, and/or the duration of the media session in the session report. In some examples, the report generating circuitry 332 (FIG. 3) generates the session report.

At block 828, the metering circuitry 118 transmits the session report. For example, the metering circuitry 118 can transmit the session report to the audience measurement entity 106 (FIGS. 1 and 5) via the network 108. In some examples, the report transmitting circuitry 334 (FIG. 3) transmits the session report to the data collection facility 120 (FIGS. 1 and 5) via the network 108.

At block 830, the metering circuitry 118 determines whether to continue monitoring. For example, the metering circuitry 118 can determine whether to monitor another media session. To continue monitoring, the operations return to block 804. Otherwise, the operations 800 terminate.

FIG. 9 is a flowchart representative of example machine readable instructions and/or example operations 900 that may be executed and/or instantiated by processor circuitry to generate session demographics reports. The machine readable instructions and/or operations 900 of FIG. 9 begin at block 902, at which the audience measurement entity 106 (FIGS. 1 and 5) receives a session identifier and at least one viewer identifier associated with a media session. For example, the data collection facility 120 (FIGS. 1 and 5) can receive the session identifier, at least one panelist identifier, and/or an indication of at least one guest that encountered the media session from the media presentation environment 104 (FIGS. 1 and 3) via the network 108 (FIG. 1). In some examples, the session report receiving circuitry 502 (FIG. 5) receives a session report including the session identifier, the panelist identifier(s), and/or the indication of the guest(s) that encountered the media session. For example, the session report receiving circuitry 502 can receive the session report from the metering circuitry 118 (FIGS. 1 and 3) via the network 108.

At block 904, the audience measurement entity 106 identifies demographics of the viewer(s). For example, the data collection facility 120 can identify the demographics of the viewer(s) identified in the session report. In some examples, the session report processing circuitry 504 (FIG. 5) performs a look-up of the received panelist identifier(s) in the panelist database 506 (FIG. 5) to determine demographics associated with the respective panelist(s). Additionally, the session report processing circuitry 504 can determine devices associated with the respective panelist(s) via the panelist database 506.

At block 906, the audience measurement entity 106 generates a session demographics report. For example, the data collection facility 120 can generate the session demographics report based on the session report and data in the panelist database 506. In some examples, the session report processing circuitry 504 includes the identifier associated with the viewing session, the timestamp associated with the viewing session, the demographics associated with the panelist identifier(s), and/or the device(s) associated with the panelist identifier(s) in the session demographics report.

At block 908, the audience measurement entity 106 transmits the session demographics report. For example, the data collection facility 120 can transmit the session demographics report to the media provider 102 (FIGS. 1 and 2) via the network 108. In some examples, the demographics report transmitting circuitry 508 transmits the session demographics report to the session processing circuitry 112 (FIGS. 1 and 2) and/or the viewer processing circuitry 114 (FIGS. 1 and 2).

FIG. 10 is a flowchart representative of example machine readable instructions and/or example operations 1000 that may be executed and/or instantiated by processor circuitry to correlate media with demographics of an identified audience. The machine readable instructions and/or operations 1000 of FIG. 10 begin at block 1002, at which the media provider 102 (FIGS. 1 and 2) receives the session demographics report. For example, the viewer processing circuitry 114 (FIGS. 1 and 2) can receive the session demographics report. In some examples, the report processing circuitry 218 (FIG. 2) receives the session demographics report. In turn, the report processing circuitry 218 can relay information in the session demographics report to the media identifying circuitry 220 (FIG. 2) and/or the media correlating circuitry 224 (FIG. 2).

At block 1004, the media provider 102 identifies media encountered during the media session. For example, the viewer processing circuitry 114 can identify the media encountered during the media session. In advance of receiving the session demographics report, the session correlating circuitry 216 (FIG. 2) links media presented during viewing sessions with the identifier associated with the media session, an indication of the media, an address of the media device to which the media was provided, the start time of the viewing session, the end time of the viewing session, and/or the duration of the viewing session in the media identification database 222 (FIG. 2). In some examples, the media identifying circuitry 220 receives an indication of the identifier associated with the media session, an indication of one or more devices associated with the viewer(s), and/or a time of the media session received in the session demographics report. In turn, the media identifying circuitry 220 can perform a look-up of the identifier associated with the media session in the media identification database 222 to determine the media encountered during the media session. In some examples, the media identifying circuitry 220 can verify the media encountered during the viewing session using the time of the media session and/or the device(s) associated with the viewer(s). In turn, the media identifying circuitry 220 can provide an indication of the media encountered during the media session to the media correlating circuitry 224.

At block 1006, the media provider 102 correlates the media encountered during the media session with demographic information associated with the identified audience. For example, the viewer processing circuitry 114 can correlate the media with the demographic information associated with the viewer(s). The media correlating circuitry 224 receives the demographic information associated with the viewer(s) and, in turn, can store the demographic information with an indication of the media encountered during the media session in the media demographics database 226.

Figure 11:
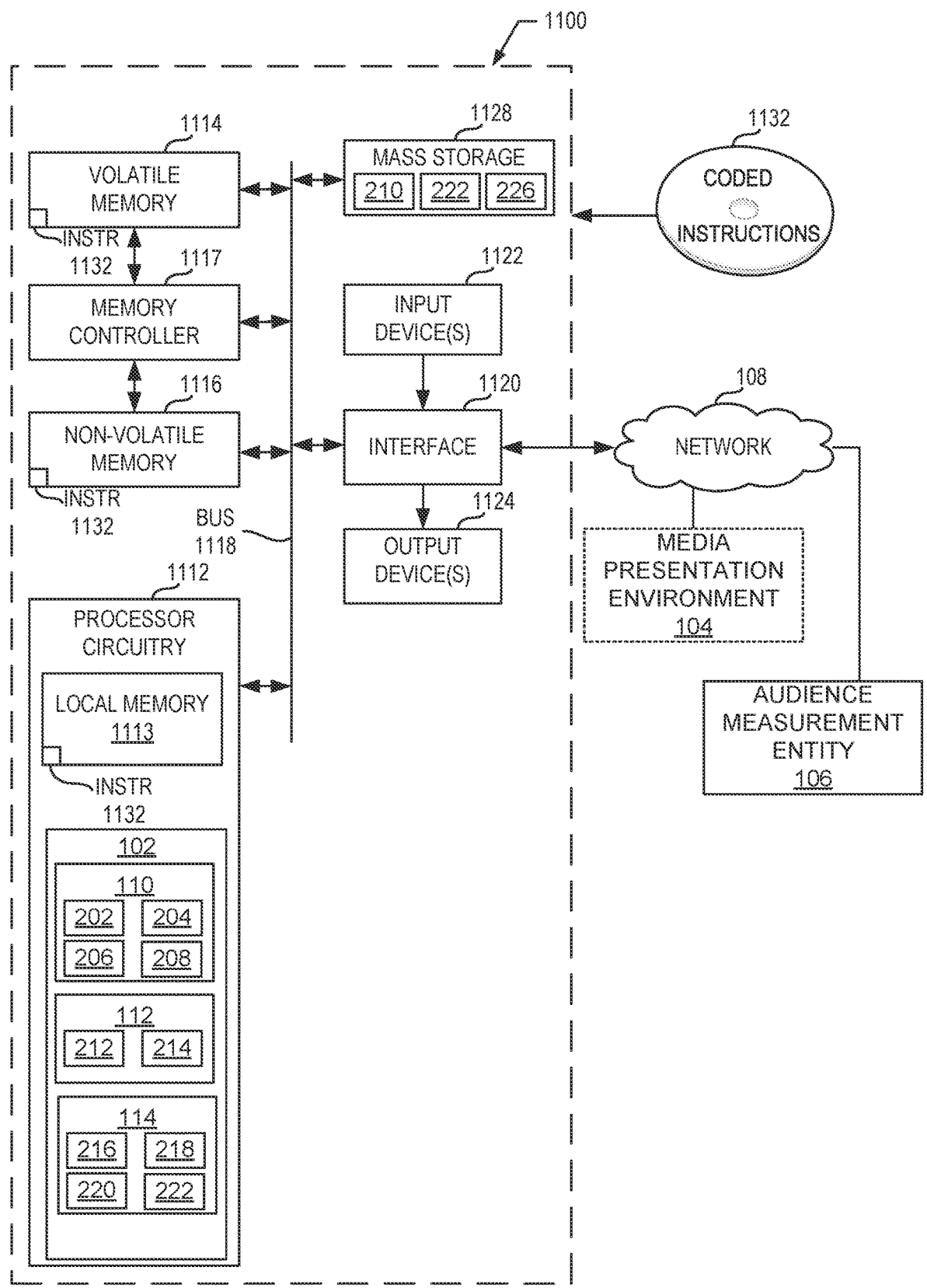
FIG. 11 is a block diagram of an example processing platform including processor circuitry structured to execute the example machine readable instructions of FIGS. 6 and/or 10 to implement the example media provider of FIGS. 1 and 2.

FIG. 11 is a block diagram of an example processor platform 1100 structured to execute and/or instantiate the machine readable instructions and/or operations of FIGS. 6 and/or 10 to implement the media provider 102 of FIGS. 1 and 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the media provider 102, the signature processing circuitry 110, the session processing circuitry 112, the viewer processing circuitry 114, the signature generating circuitry 202, the identifier generating circuitry 204, the signature-identifier linking circuitry 206, the signature-identifier transmitting circuitry 208, the signature transmitting circuitry 212, the session identifying circuitry 214, the session correlating circuitry 216, report processing circuitry 218, media identifying circuitry 220, and media correlating circuitry 224.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by the network 108. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine readable instructions 1132, which may be implemented by the machine readable instructions of FIGS. 6 and 10, may be stored in the mass storage device 1128, in the volatile memory 1114, in the non-volatile memory 1116, and/or on a removable non-transitory computer readable storage medium such as a CD or DVD. In this example, the mass storage device 1128 implements the signature-identifier database 210, the media identification database 222, and the media demographics database 226.

Figure 12:
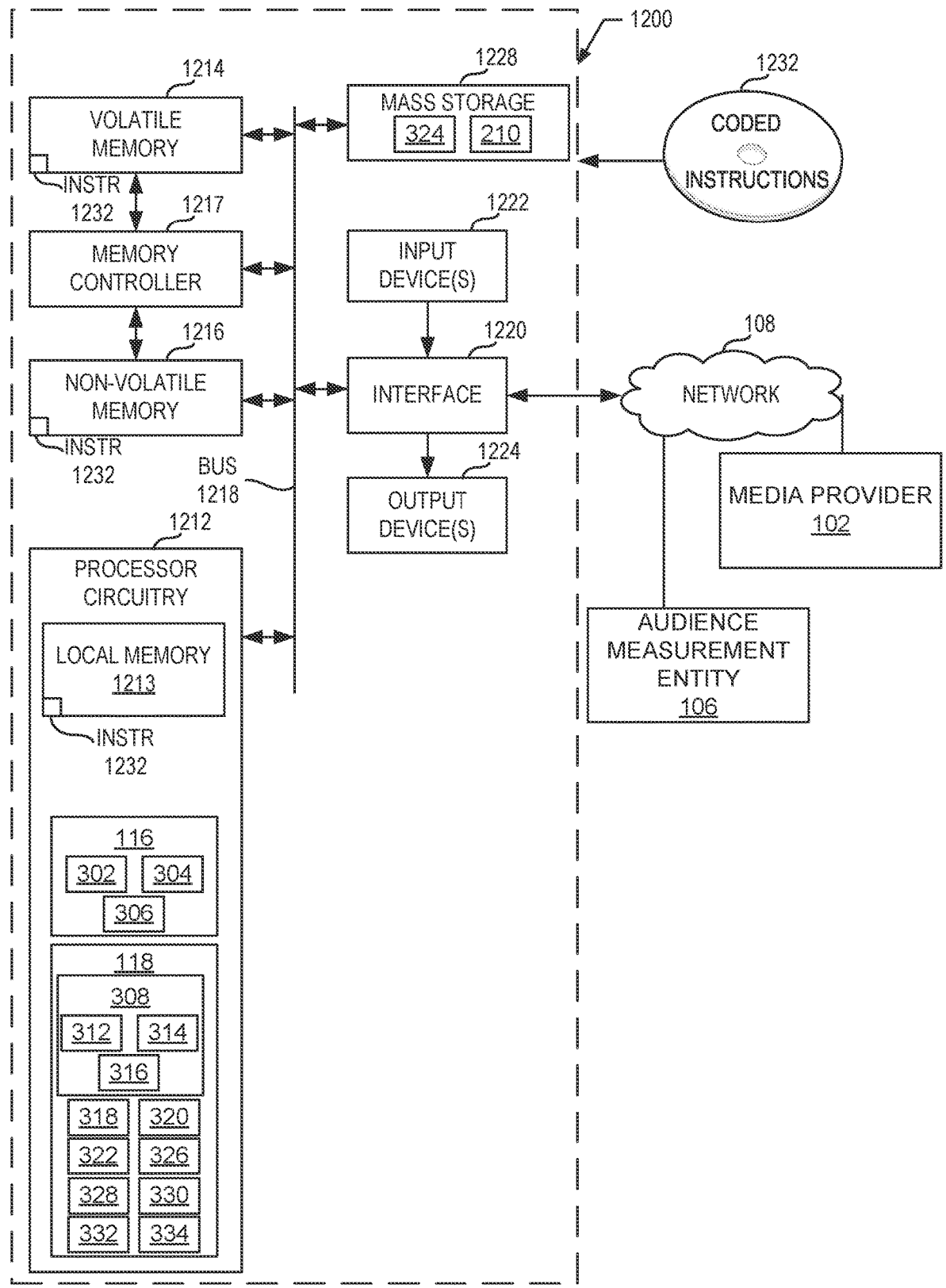
FIG. 12 is a block diagram of an example processing platform including processor circuitry structured to execute the example machine readable instructions of FIGS. 7 and/or 8 to implement the example presentation environment of FIGS. 1 and/or 3.

FIG. 12 is a block diagram of an example processor platform 1200 structured to execute and/or instantiate the machine readable instructions and/or operations of FIGS. 7 and/or 8 to implement the media presentation environment 104 of FIGS. 1 and 3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the media presentation environment 104, the media presentation device 116, the metering circuitry 118, the session transmitting circuitry 302, the signature processing circuitry 304, the media presenting circuitry 306, the camera 308, the image sensor 312, the image obfuscating circuitry 314, the image processing circuitry 316, the feature identifying circuitry 318, the motion detecting circuitry 320, the panelist identifying circuitry 322, the viewer prompting circuitry 326, the profile generating circuitry 328, the signature identifying circuitry 330, the report generating circuitry 332, and the report transmitting circuitry 334.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by the network 108. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine readable instructions 1232, which may be implemented by the machine readable instructions of FIGS. 7 and 8, may be stored in the mass storage device 1228, in the volatile memory 1214, in the non-volatile memory 1216, and/or on a removable non-transitory computer readable storage medium such as a CD or DVD. In this example, the mass storage device 1228 implements the signature-identifier database 210 and the panelist identification database 324.

Figure 13:
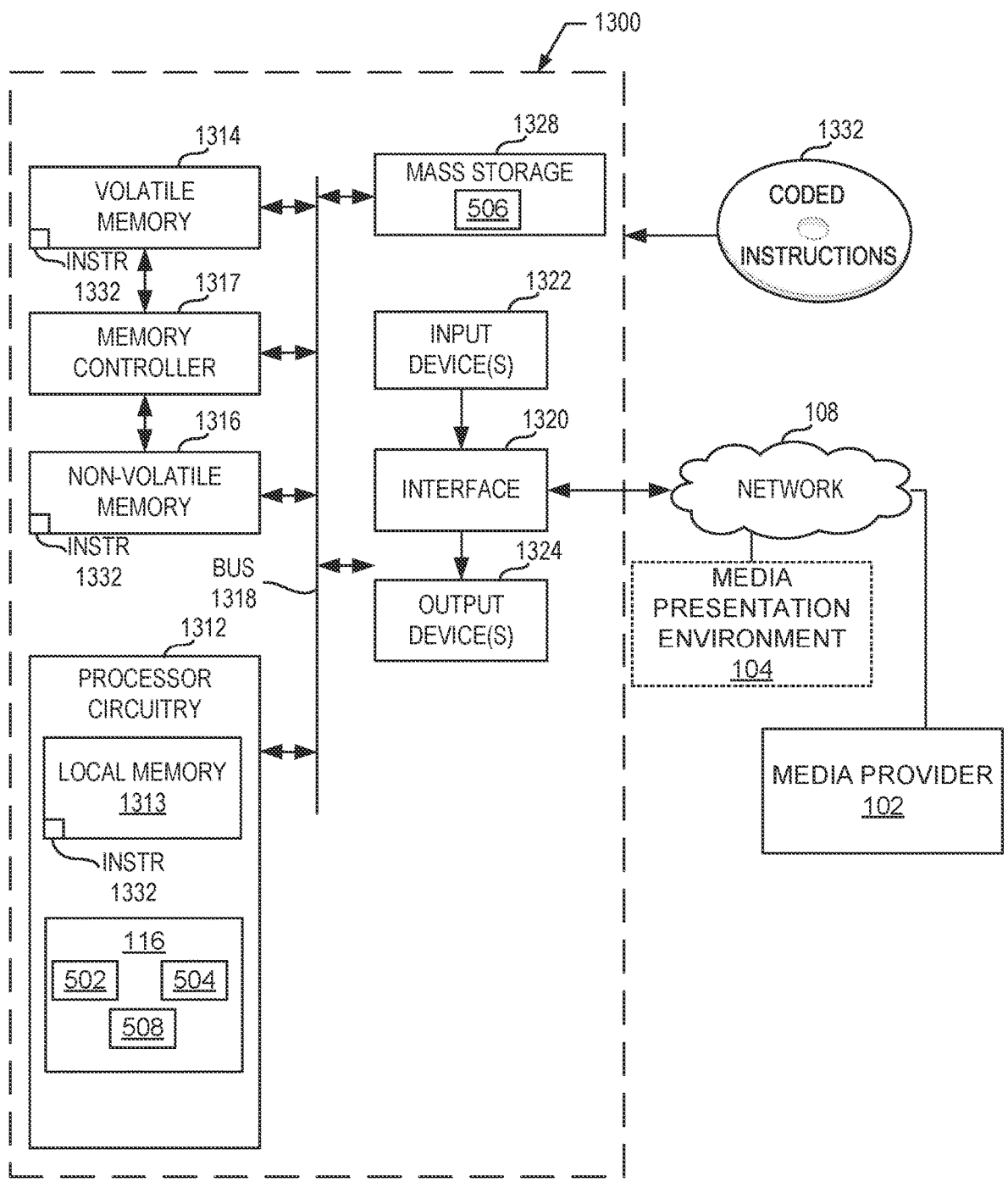
FIG. 13 is a block diagram of an example processing platform including processor circuitry structured to execute the example machine readable instructions of FIG. 9 to implement the example audience measurement entity of FIGS. 1 and/or 4.

FIG. 13 is a block diagram of an example processor platform 1300 structured to execute and/or instantiate the machine readable instructions and/or operations of FIG. 9 to implement the audience measurement entity 106 of FIGS. 1 and 5. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the audience measurement entity 106, the data collection facility, the session report receiving circuitry 502, the session report processing circuitry 504, and the demographics report transmitting circuitry 508.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine readable instructions 1332, which may be implemented by the machine readable instructions of FIG. 9, may be stored in the mass storage device 1328, in the volatile memory 1314, in the non-volatile memory 1316, and/or on a removable non-transitory computer readable storage medium such as a CD or DVD. In this example, the mass storage device 1328 implements the panelist database 506.

Figure 14:
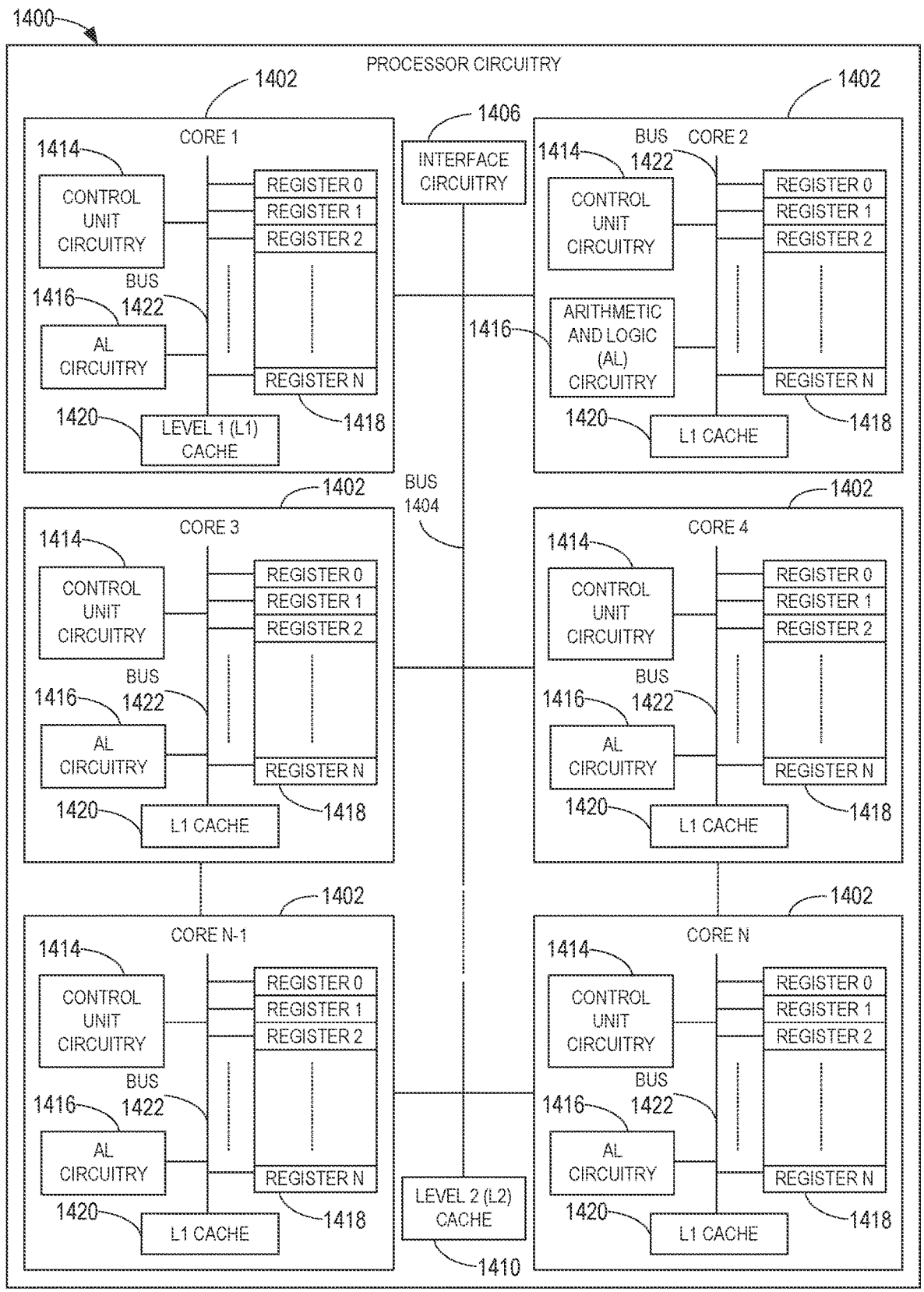
FIG. 14 is a block diagram of an example implementation of the processor circuitry of FIGS. 10, 11, and/or 12.

FIG. 14 is a block diagram of an example implementation of the processor circuitry 1112 of FIG. 11, 1212 of FIG. 12, and/or 1312 of FIG. 13. In this example, the processor circuitry 1112 of FIG. 11, 1212 of FIG. 12, and/or 1312 of FIG. 13 is implemented by a microprocessor 1400. The microprocessor 1400 executes some or all of the machine readable instructions of the flowcharts of FIGS. 6-10 to effectively instantiate the circuitry of FIGS. 1-3 and 5 as logic circuits to perform the operations corresponding to those machine readable instructions. In some such examples, the circuitry of FIGS. 1-3 and 5 is instantiated by the hardware circuits of the microprocessor 1400 in combination with the instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowchart of FIG. 14.

The cores 1402 may communicate by an example bus 1404. In some examples, the bus 1404 may be implemented by a communication bus to effectuate communication associated with one(s) of the cores 1402. For example, the bus 1404 may be implemented by at least one of an Inter-Integrated Circuit (I2C) bus, a Serial Peripheral Interface (SPI) bus, a PCI bus, or a PCIe bus. Additionally or alternatively, the bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2-cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1114, 1116 of FIG. 11, the main memory 1214, 1216 of FIG. 12, and/or the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and an example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The bus 1420 may be implemented by at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
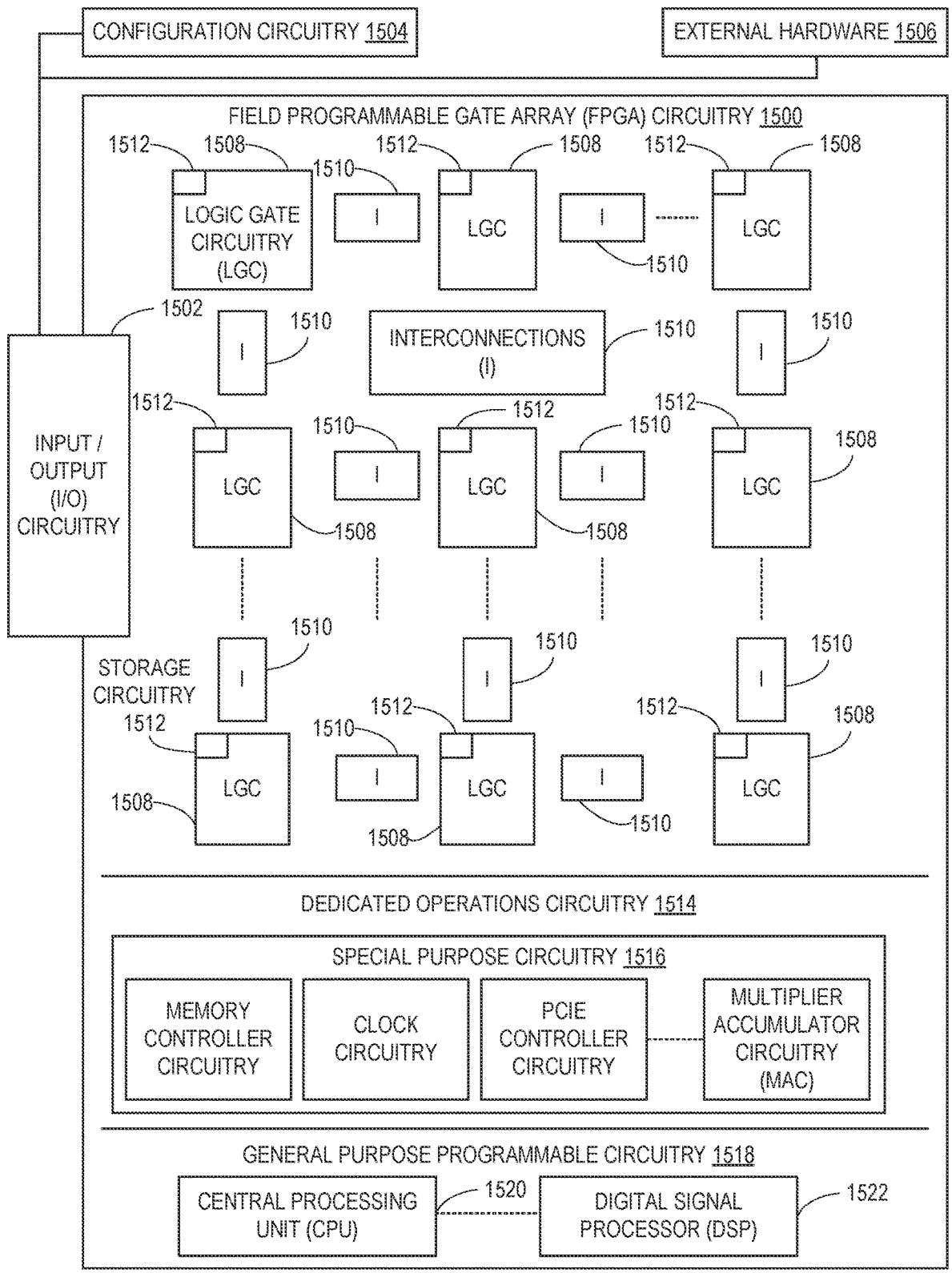
FIG. 15 is a block diagram of another example implementation of the processor circuitry of FIGS. 10, 11, and/or 12.

FIG. 15 is a block diagram of another example implementation of the processor circuitry 1112 of FIG. 11, 1212 of FIG. 12, and/or 1312 of FIG. 13. In this example, the processor circuitry 1112, 1212, 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 6-10 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 6-10. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 6-10. As such, the FPGA circuitry 1500 may be structured to effectively instantiate some or all of the machine readable instructions of the flowcharts of FIGS. 6-10 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIG. 15 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may be implemented by an Artificial Intelligence/Machine Learning (AI/ML) model to generate the instructions), etc. In some examples, the external hardware 1506 may be implemented by external hardware circuitry. For example, the external hardware 1506 may be implemented by the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations that may correspond to at least some of the machine readable instructions of FIG. 6-10 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 5 and 6 illustrate two example implementations of the processor circuitry 412 of FIG. 4, many other approaches are contemplated. For example, as mentioned above, modern FPGA circuitry may include an on-board CPU, such as one or more of the example CPU 1520 of FIG. 15. Therefore, the processor circuitry 1112 of FIG. 11, 1212 of FIG. 12, and/or 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 6-10 may be executed by one or more of the cores 1402 of FIG. 14 and a second portion of the machine readable instructions represented by the flowcharts of FIGS. 6-10 may be executed by the FPGA circuitry 1500 of FIG. 15.

In some examples, the processor circuitry 1112 of FIG. 11, 1212 of FIG. 12, and/or 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the processor circuitry 1112 of FIG. 11, 1212 of FIG. 12, and/or 1312 of FIG. 13, which may be in one or more packages. For example, the XPU may include a CPU in one package, a DSP in another package, a GPU in yet another package, and an FPGA in still yet another package.

Figure 16:
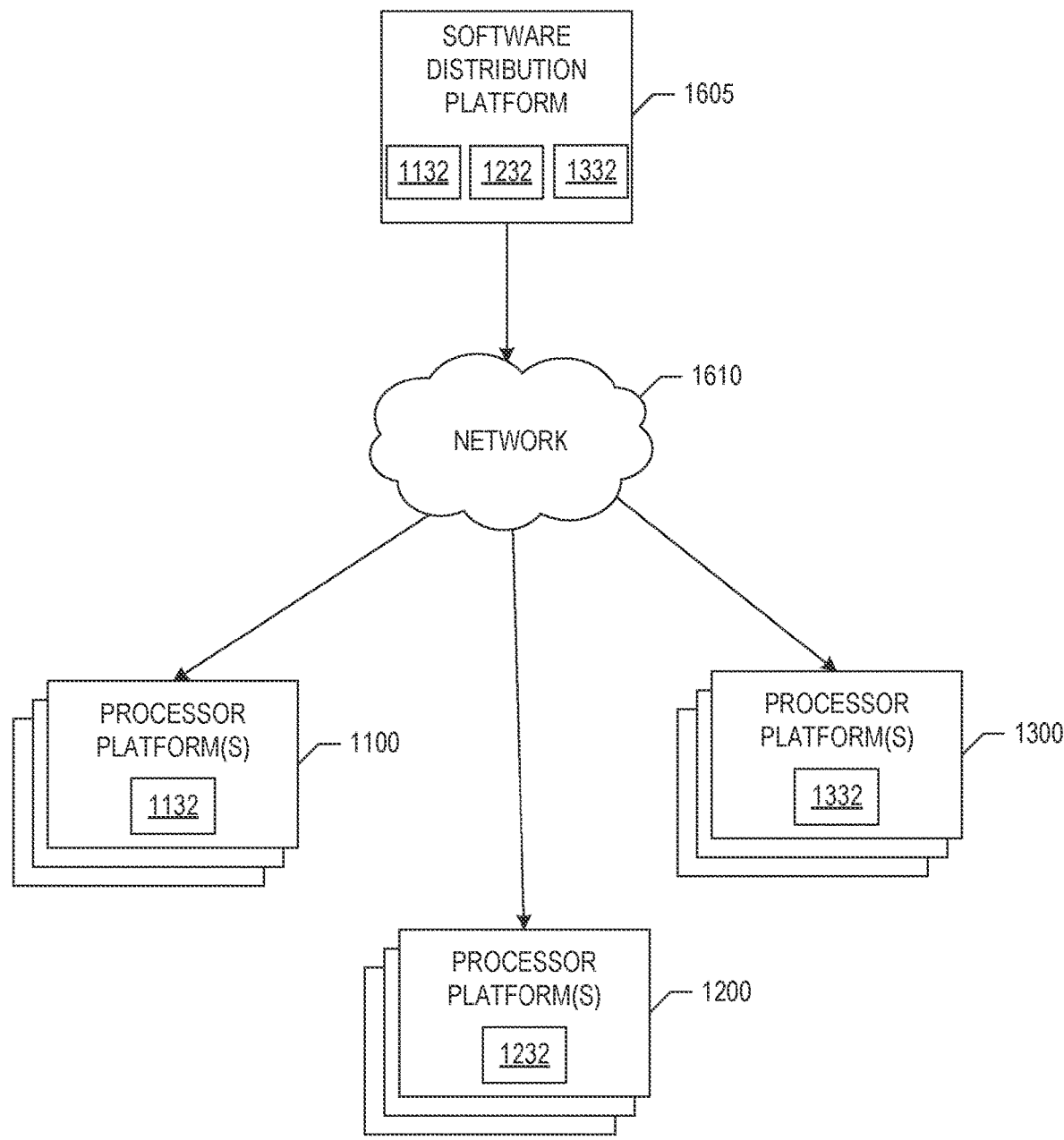
FIG. 16 is a block diagram of an example software distribution platform (e.g., one or more servers) to distribute software (e.g., software corresponding to the example machine readable instructions of FIGS. 5, 6, 7, 8, and/or 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1132 of FIG. 11, the example machine readable instructions 1232 of FIG. 12, and/or the example machine readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1132 of FIG. 11, the example machine readable instructions 1232 of FIG. 12, and/or the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1132, 1232, 1332, which may correspond to the example machine readable instructions 600, 700, 800, 900, 1000 of FIGS. 6-10, as described above. The one or more servers of the example software distribution platform 1605 are in communication with an example network 1610, which may correspond to any one or more of the Internet and/or the example network 108 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132, 1232, 1332 from the software distribution platform 1605. For example, the software, which may correspond to the example machine readable instructions 1132 of FIG. 11, the example machine readable instructions 1232 of FIG. 12, and/or the example machine readable instructions 1332 of FIG. 13, may be downloaded to the example processor platforms 1100, 1200, 1300, respectively which are to execute the machine readable instructions 1132, 1232, 1332 to implement the media provider 102, the media presentation environment 104, and the audience measurement entity 106, respectively. In some examples, one or more servers of the software distribution platform 1605 periodically offer, transmit, and/or force updates to the software (e.g., the example machine readable instructions 1132 of FIG. 11, the example machine readable instructions 1232 of FIG. 12, and/or the example machine readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that produce obfuscated recordings of a viewing environment such that viewers can be identified while avoiding being overly intrusive on the privacy of the viewer. The disclosed systems, methods, apparatus, and articles of manufacture improve the efficiency of using a computing device by minimizing or otherwise reducing processor resources utilized to convert image signals into an image, which typically presents a bottleneck in producing the image. Specifically, the disclosed systems, methods, apparatus, and articles of manufacture reduce the image signals utilized to present the image and/or cause certain signals to correspond to a greater portion of the image such that the image processor can convert image signals to images at a faster rate. Thus, the disclosed systems, methods, apparatus, and articles of manufacture can produce recordings with faster frame rates to enable viewers to be identified or prompted with reduced delay in response to the viewer entering a view of a camera. Accordingly, enabling the viewers to be prompted with the reduced delay upon entering a viewing environment minimizes or otherwise reduces an annoyance encountered by the viewer as a result of being prompted to provide information. Additionally, the disclosed systems, methods, apparatus, and articles of manufacture minimizes or otherwise reduces interruptions utilized to identify the viewer over time as features of the viewer are learned. As such, the disclosed systems, methods, apparatus, and articles of manufacture enable viewers to be identified while avoiding interruptions in media being presented and reducing a burden on the privacy or security of the viewer. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to produce and obfuscated depiction of a viewing environment and identify viewers via the obfuscated depiction are disclosed herein. Further examples and combinations thereof include the following:

Example 1 includes an apparatus comprising a camera to capture an obfuscated recording of a viewing environment, feature identifying circuitry to identify one or more features of a viewer in the viewing environment based on the obfuscated recording, and panelist identifying circuitry to identify a panelist in the viewing environment based on the one or more identified features of the viewer.

Example 2 includes the apparatus of example 1, wherein the camera includes an obfuscating lens, the obfuscating lens to obfuscate the viewing environment captured by the camera.

Example 3 includes the apparatus of example 2, wherein the obfuscating lens is chemically sprayed.

Example 4 includes the apparatus of example 2, wherein the obfuscating lens is at least one of sanded or sandblasted to produce a surface roughness.

Example 5 includes the apparatus of example 4, wherein the surface roughness satisfies a roughness threshold.

Example 6 includes the apparatus of example 5, wherein the roughness threshold is a first roughness threshold, wherein the surface roughness satisfies a second roughness threshold greater than the first roughness threshold.

Example 7 includes the apparatus of example 1, further including image obfuscating circuitry to prevent the camera from capturing a non-obfuscated view of the viewing environment.

Example 8 includes the apparatus of example 1, further including viewer prompting circuitry to prompt the viewer to provide a panelist identifier in response to the one or more identified features of the viewer being different from one or more features previously identified for the panelist.

Example 9 includes the apparatus of example 8, wherein the panelist is a first panelist of a plurality of panelists, further including profile generating circuitry to update one or more features in a first profile associated with the first panelist in response to the panelist identifier provided by the viewer being associated with the first panelist, and generate a second profile to associate with the viewer in response to the panelist identifier provided by the viewer being associated with a second panelist, the second profile including the one or more identified features of the viewer.

Example 10 includes the apparatus of example 1, further including motion detecting circuitry to detect motion within the viewing environment, the feature identifying circuitry to search for a silhouette of the viewer within the viewing environment in response to the motion detecting circuitry detecting the motion.

Example 11 includes the apparatus of example 9, wherein the feature identifying circuitry is to identify a facial region of the viewer in response to identifying the silhouette of the viewer, the feature identifying circuitry to cause the camera to zoom in on the identified facial region.

Example 12 includes the apparatus of example 1, wherein the one or more features of the viewer include one or more of (I) a face size of the viewer, (II) at least one of a size, a shape, a color, or a relative location of eyebrows of the viewer, (III) at least one of a size, a shape, a color, or a relative location of hair of the viewer, (IV) at least one of a position, a size, a shape, or a color of eyes of the viewer, or (V) at least one of a position, a size, or a shape of a nose of the viewer.

Example 13 includes an apparatus comprising a camera to capture an obfuscated recording of a viewing environment, at least one memory, machine readable instructions, and processor circuitry to at least one of instantiate or execute the machine readable instructions to identify one or more features of a viewer in the viewing environment based on the obfuscated recording, and identify a panelist in the viewing environment based on the one or more identified features of the viewer.

Example 14 includes the apparatus of example 13, wherein the camera includes an obfuscating lens, the obfuscating lens to obfuscate the viewing environment captured by the camera.

Example 15 includes the apparatus of example 14, wherein the obfuscating lens includes a rough surface.

Example 16 includes the apparatus of example 14, wherein the obfuscating lens is chemically sprayed to form an obfuscating surface.

Example 17 includes the apparatus of example 13, wherein the processor circuitry is to prevent the camera from capturing a non-obfuscated view of the viewing environment.

Example 18 includes the apparatus of example 13, wherein the processor circuitry is to prompt the viewer to provide a panelist identifier in response to the one or more identified features of the viewer being different from one or more features previously identified for the panelist.

Example 19 includes the apparatus of example 18, wherein the panelist is a first panelist of a plurality of panelists, wherein the processor circuitry is to update one or more features in a first profile associated with the first panelist in response to the panelist identifier provided by the viewer being associated with the first panelist, and generate a second profile to associate with the viewer in response to the panelist identifier provided by the viewer being associated with a second panelist, the second profile including the one or more identified features of the viewer.

Example 20 includes an apparatus comprising means for capturing a recording of a viewing environment, means for obfuscating the recording captured by the camera to prevent the camera from capturing a non-obfuscated recording of the viewing environment, means for identifying one or more features of a viewer in the viewing environment based on the recording of the viewing environment, and means for identifying a panelist in the viewing environment based on the one or more identified features of the viewer.

Example 21 includes the apparatus of example 20, wherein the means for obfuscating is implemented by at least one of an obfuscating lens or processor circuitry associated with the camera, at least one of the obfuscating lens or the processor circuitry to cause the viewing environment to be obfuscated through a view of the camera.

Example 22 includes the apparatus of example 20, further including means for prompting to prompt the viewer to provide a panelist identifier in response to the one or more identified features of the viewer being different from one or more features previously identified for the panelist.

Example 23 includes the apparatus of example 22, wherein the panelist is a first panelist of a plurality of panelists, further including means for generating viewer profiles to update one or more features in a first profile associated with the first panelist in response to the panelist identifier provided by the viewer being associated with the first panelist, and generate a second profile to associate with the viewer in response to the panelist identifier provided by the viewer being associated with a second panelist, the second profile including the one or more identified features of the viewer.

Example 24 includes the apparatus of example 20, further including means for detecting motion within the viewing environment, wherein the means for identifying one or more features of the viewer is to identify a silhouette of the viewer within the viewing environment in response to the means for detecting motion detecting motion, identify a facial region of the viewer in response to identifying the silhouette of the viewer, cause the camera to magnify a view of the identified facial region, and identify one or more of (I) a face size of the viewer, (II) at least one of a size, a shape, a color, or a relative location of eyebrows of the viewer, (III) at least one of a size, a shape, a color, or a relative location of hair of the viewer, or (IV) at least one of a position or a size of eyes of the viewer in response to the camera magnifying the view of the identified facial region, or (V) at least one of a position or a size of a nose of the viewer in response to the camera magnifying the view of the identified facial region.

Example 25 includes a non-transitory machine readable storage medium comprising instructions that, when executed, cause processor circuitry to at least capture an obfuscated recording of a viewing environment, identify one or more features of a viewer in the viewing environment based on the obfuscated recording, and identify a panelist in the viewing environment based on the one or more identified features of the viewer.

Example 26 includes the non-transitory machine readable storage medium of example 25, wherein the instructions, when executed, cause the processor circuitry to prevent a non-obfuscated view of the viewing environment from being captured.

Example 27 includes the non-transitory machine readable storage medium of example 25, wherein the instructions, when executed, cause the processor circuitry to prompt the viewer to provide a panelist identifier in response to the one or more identified features of the viewer being different from one or more features previously identified for the panelist.

Example 28 includes the non-transitory machine readable storage medium of example 27, wherein the panelist is a first panelist of a plurality of panelists, wherein the instructions, when executed, cause the processor circuitry to update one or more features in a first profile associated with the first panelist in response to the panelist identifier provided by the viewer being associated with the first panelist, and generate a second profile to associate with the viewer in response to the panelist identifier provided by the viewer being associated with a second panelist, the second profile including the one or more identified features of the viewer.

Example 29 includes the non-transitory machine readable storage medium of example 25, wherein the instructions, when executed, cause the processor circuitry to detect a motion within the viewing environment, and search for a silhouette of the viewer within the viewing environment in response to detecting the motion.

Example 30 includes the non-transitory machine readable storage medium of example 29, wherein the instructions, when executed, cause the processor circuitry to identify a facial region of the viewer in response to identifying the silhouette of the viewer, and magnify the identified facial region.

Example 31 includes the non-transitory machine readable storage medium of example 25, wherein the one or more features of the viewer include one or more of (I) a face size of the viewer, (II) at least one of a size, a shape, a color, or a relative location of eyebrows of the viewer, or (III) at least one of a size, a shape, a color, or a relative location of hair of the viewer.

Example 32 includes the non-transitory machine readable storage medium of example 25, wherein the one or more features of the viewer include one or more of (I) a position of eyes of the viewer, (II) a size of the eyes of the viewer, (III) a color of the eyes of the viewer, (IV) a position of a nose of the viewer, or (V) a size of the nose of the viewer.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a camera to capture an obfuscated recording of a viewing environment, wherein the camera includes an obfuscating lens, the obfuscating lens to obfuscate the viewing environment captured by the camera, wherein the obfuscating lens is chemically sprayed;
feature identifying circuitry to identify one or more features of a viewer in the viewing environment based on the obfuscated recording; and
panelist identifying circuitry to identify a panelist in the viewing environment based on the one or more identified features of the viewer.

2. An apparatus comprising:
a camera to capture an obfuscated recording of a viewing environment, wherein the camera includes an obfuscating lens, the obfuscating lens to obfuscate the viewing environment captured by the camera, wherein the obfuscating lens is at least one of sanded or sandblasted to produce a surface roughness;
feature identifying circuitry to identify one or more features of a viewer in the viewing environment based on the obfuscated recording; and
panelist identifying circuitry to identify a panelist in the viewing environment based on the one or more identified features of the viewer.

3. The apparatus of claim 2, wherein the surface roughness satisfies a roughness threshold.

4. The apparatus of claim 3, wherein the roughness threshold is a first roughness threshold, wherein the surface roughness satisfies a second roughness threshold greater than the first roughness threshold.

5. An apparatus comprising:
a camera to capture an obfuscated recording of a viewing environment;
feature identifying circuitry to identify one or more features of a viewer in the viewing environment based on the obfuscated recording;
panelist identifying circuitry to identify a first panelist in the viewing environment based on the one or more identified features of the viewer;
viewer prompting circuitry to prompt the viewer to provide a panelist identifier in response to the one or more identified features of the viewer being different from one or more features previously identified for the first panelist; and profile generating circuitry to:
- update one or more features in a first profile associated with the first panelist in response to the panelist identifier provided by the viewer being associated with the first panelist; and
- generate a second profile to associate with the viewer in response to the panelist identifier provided by the viewer being associated with a second panelist, the second profile including the one or more identified features of the viewer.

6. The apparatus of claim 5, wherein the camera includes an obfuscating lens, the obfuscating lens to obfuscate the viewing environment captured by the camera.

7. The apparatus of claim 5, further including image obfuscating circuitry to prevent the camera from capturing a non-obfuscated view of the viewing environment.

8. The apparatus of claim 5, further including motion detecting circuitry to detect motion within the viewing environment, the feature identifying circuitry to search for a silhouette of the viewer within the viewing environment in response to the motion detecting circuitry detecting the motion.

9. An apparatus comprising:
- a camera to capture an obfuscated recording of a viewing environment;
- feature identifying circuitry to identify one or more features of a viewer in the viewing environment based on the obfuscated recording, wherein the feature identifying circuitry is to:
  - detect motion within the viewing environment;
  - search for a silhouette of the viewer within the viewing environment in response to the motion being detected; and
  - identify a facial region of the viewer in response to identifying the silhouette of the viewer, the feature identifying circuitry to cause the camera to zoom in on the identified facial region; and
- panelist identifying circuitry to identify a panelist in the viewing environment based on the one or more identified features of the viewer.

10. The apparatus of claim 9, further including viewer prompting circuitry to prompt the viewer to provide a panelist identifier in response to the one or more identified features of the viewer being different from one or more features previously identified for the panelist.

11. The apparatus of claim 9, wherein the one or more features of the viewer include one or more of (I) a face size of the viewer, (II) at least one of a size, a shape, a color, or a relative location of eyebrows of the viewer, (III) at least one of a size, a shape, a color, or a relative location of hair of the viewer, (IV) at least one of a position, a size, a shape, or a color of eyes of the viewer, or (V) at least one of a position, a size, or a shape of a nose of the viewer.

12. An apparatus comprising:
- a camera to capture an obfuscated recording of a viewing environment, wherein the camera includes an obfuscating lens, the obfuscating lens to obfuscate the viewing environment captured by the camera, wherein the obfuscating lens includes a rough surface
- memory;
- machine readable instructions; and
- processor circuitry to at least one of instantiate or execute the machine readable instructions to:
  - identify one or more features of a viewer in the viewing environment based on the obfuscated recording; and
  - identify a panelist in the viewing environment based on the one or more identified features of the viewer.

13. The apparatus of claim 12, wherein the processor circuitry is to prevent the camera from capturing a non-obfuscated view of the viewing environment.

14. The apparatus of claim 12, wherein the processor circuitry is to prompt the viewer to provide a panelist identifier in response to the one or more identified features of the viewer being different from one or more features previously identified for the panelist.

15. An apparatus comprising:
- a camera to capture an obfuscated recording of a viewing environment, wherein the camera includes an obfuscating lens, the obfuscating lens to obfuscate the viewing environment captured by the camera, wherein the obfuscating lens is chemically sprayed to form an obfuscating surface;
- memory;
- machine readable instructions; and
- processor circuitry to at least one of instantiate or execute the machine readable instructions to:
  - identify one or more features of a viewer in the viewing environment based on the obfuscated recording; and
  - identify a panelist in the viewing environment based on the one or more identified features of the viewer.

16. An apparatus comprising:
- a camera to capture an obfuscated recording of a viewing environment;
- memory;
- machine readable instructions; and
- processor circuitry to at least one of instantiate or execute the machine readable instructions to:
  - identify one or more features of a viewer in the viewing environment based on the obfuscated recording;
  - identify a first panelist in the viewing environment based on the one or more identified features of the viewer;
  - prompt the viewer to provide a panelist identifier in response to the one or more identified features of the viewer being different from one or more features previously identified for the first panelist;
  - update one or more features in a first profile associated with the first panelist in response to the panelist identifier provided by the viewer being associated with the first panelist; and
  - generate a second profile to associate with the viewer in response to the panelist identifier provided by the viewer being associated with a second panelist, the second profile including the one or more identified features of the viewer.

17. The apparatus of claim 16, wherein the camera includes an obfuscating lens, the obfuscating lens to obfuscate the viewing environment captured by the camera.

18. An apparatus comprising:
- means for capturing a recording of a viewing environment;
- means for obfuscating the recording captured by the means for capturing to prevent the means for capturing from capturing a non-obfuscated recording of the viewing environment;
- means for identifying one or more features of a viewer in the viewing environment based on the recording of the viewing environment;

means for identifying a first panelist in the viewing environment based on the one or more identified features of the viewer;
means for prompting to prompt the viewer to provide a panelist identifier in response to the one or more identified features of the viewer being different from one or more features previously identified for the first panelist;
means for generating viewer profiles to;
  update one or more features in a first profile associated with the first panelist in response to the panelist identifier provided by the viewer being associated with the first panelist; and
  generate a second profile to associate with the viewer in response to the panelist identifier provided by the viewer being associated with a second panelist, the second profile including the one or more identified features of the viewer.

19. The apparatus of claim 18, wherein the means for obfuscating is implemented by at least one of an obfuscating lens or processor circuitry associated with the means for capturing, at least one of the obfuscating lens or the processor circuitry to cause the viewing environment to be obfuscated through a view of the means for capturing.

20. The apparatus of claim 18, further including means for detecting motion within the viewing environment, wherein the means for identifying one or more features of the viewer is to:
  identify a silhouette of the viewer within the viewing environment in response to the means for detecting motion detecting motion;
  identify a facial region of the viewer in response to identifying the silhouette of the viewer;
  cause the means for capturing to magnify a view of the identified facial region; and
  identify one or more of (I) a face size of the viewer, (II) at least one of a size, a shape, a color, or a relative location of eyebrows of the viewer, (III) at least one of a size, a shape, a color, or a relative location of hair of the viewer, or (IV) at least one of a position or a size of eyes of the viewer in response to the means for capturing magnifying the view of the identified facial region, or (V) at least one of a position or a size of a nose of the viewer in response to the means for capturing magnifying the view of the identified facial region.

21. A non-transitory machine readable storage medium comprising instructions that, when executed, cause processor circuitry to at least:
  capture an obfuscated recording of a viewing environment;
  identify one or more features of a viewer in the viewing environment based on the obfuscated recording;
  identify a first panelist in the viewing environment based on the one or more identified features of the viewer;
  prompt the viewer to provide a panelist identifier in response to the one or more identified features of the viewer being different from one or more features previously identified for the first panelist;
  update one or more features in a first profile associated with the first panelist in response to the panelist identifier provided by the viewer being associated with the first panelist; and
  generate a second profile to associate with the viewer in response to the panelist identifier provided by the viewer being associated with a second panelist, the second profile including the one or more identified features of the viewer.

22. The non-transitory machine readable storage medium of claim 21, wherein the instructions, when executed, cause the processor circuitry to prevent a non-obfuscated view of the viewing environment from being captured.

23. The non-transitory machine readable storage medium of claim 21, wherein the instructions, when executed, cause the processor circuitry to:
  detect a motion within the viewing environment; and
  search for a silhouette of the viewer within the viewing environment in response to detecting the motion.

24. The non-transitory machine readable storage medium of claim 23, wherein the instructions, when executed, cause the processor circuitry to:
  identify a facial region of the viewer in response to identifying the silhouette of the viewer; and
  magnify the identified facial region.

25. The non-transitory machine readable storage medium of claim 21, wherein the one or more features of the viewer include one or more of (I) a face size of the viewer, (II) at least one of a size, a shape, a color, or a relative location of eyebrows of the viewer, or (III) at least one of a size, a shape, a color, or a relative location of hair of the viewer.

26. The non-transitory machine readable storage medium of claim 21, wherein the one or more features of the viewer include one or more of (I) a position of eyes of the viewer, (II) a size of the eyes of the viewer, (III) a color of the eyes of the viewer, (IV) a position of a nose of the viewer, or (V) a size of the nose of the viewer.

* * * * *